US012513023B1

(12) United States Patent
Qian et al.

(10) Patent No.: US 12,513,023 B1
(45) Date of Patent: Dec. 30, 2025

(54) MESSAGE REPLICATION LATENCY MANAGEMENT USING SCALABLE VIRTUAL GATEWAYS

(71) Applicant: Amazon Technologies, Inc., Seattle, WA (US)

(72) Inventors: Baihu Qian, Chicago, IL (US); Christopher Todd Morse, Broadlands, VA (US); Mohammad Atiek Arian, Surrey (GB); Adam Lewis Palmer, East Grinstead (GB); Michael Angelo Perna, Oakland, NJ (US); Boris Litvin, Livingston, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 18/622,349

(22) Filed: Mar. 29, 2024

(51) Int. Cl.
 *H04L 12/46* (2006.01)
 *G06F 9/455* (2018.01)
 *H04L 12/18* (2006.01)
 *H04L 45/12* (2022.01)
 *H04L 45/76* (2022.01)

(52) U.S. Cl.
 CPC ...... *H04L 12/4633* (2013.01); *G06F 9/45558* (2013.01); *H04L 12/1881* (2013.01); *H04L 45/123* (2013.01); *H04L 45/76* (2022.05); *G06F 2009/45595* (2013.01)

(58) Field of Classification Search
 CPC ............. H04L 12/4633; H04L 12/1881; H04L 45/123; H04L 45/76; G06F 9/45558; G06F 2009/45595
 See application file for complete search history.

(56) References Cited

U.S. PATENT DOCUMENTS

| 7,778,273 | B2 | 8/2010 | Luo |
| 9,106,569 | B2 | 8/2015 | Amir |
| 9,699,105 | B2 | 7/2017 | Banavalikar |
| 10,742,554 | B2 | 8/2020 | Deb |
| 10,797,989 | B2 | 10/2020 | Tillotson |
| 11,044,211 | B2 | 6/2021 | Liu |
| 11,089,111 | B2 * | 8/2021 | Markuze ................. H04L 69/30 |

(Continued)

OTHER PUBLICATIONS

David Martín, "Graphs—Finding optimal routes," Data Machine Learning Visualization, Feb. 2, 2021. (Year: 2021).*

(Continued)

*Primary Examiner* — Alina A Boutah
(74) *Attorney, Agent, or Firm* — Robert C. Kowert; Kowert, Hood, Munyon, Rankin & Goetzel, P.C.

(57) ABSTRACT

A routing decisions node (RDN) of a virtual gateway established for traffic of an application group generates a replication graph representing paths for replicating messages from a message producer of the application group to a set of message consumers of the application group such that end-to-end latencies to individual ones of the message consumers satisfy a performance requirement of the application group. The graph is generated based at least partly on end-to-end message replication latency requirements of the application group, and on message latency metrics of packet processing nodes (PPNs) of the virtual gateway. The RDN sends the graph to a PPN. The PPN receives an application data message of the application group, and sends it to a destination indicated in the graph.

20 Claims, 17 Drawing Sheets

(56) References Cited

U.S. PATENT DOCUMENTS

| | | | |
|---|---|---|---|
| 11,196,591 B2 | 12/2021 | Hira | |
| 11,398,921 B2 | 7/2022 | Dunbar | |
| 11,451,467 B2 | 9/2022 | Deb | |
| 12,244,505 B1 * | 3/2025 | Huides | H04L 47/12 |
| 12,360,878 B1 * | 7/2025 | Vippagunta | G06F 11/3612 |
| 2020/0213199 A1 * | 7/2020 | Sethi | H04L 41/0823 |
| 2022/0092480 A1 * | 3/2022 | Mahadik | G06N 20/10 |
| 2022/0311681 A1 * | 9/2022 | Palladino | H04L 43/0852 |
| 2023/0153142 A1 * | 5/2023 | Shabah | G06F 9/4881 718/1 |

OTHER PUBLICATIONS

LeanData Help Center > Orchestration > Routing, "Routing—Branch Decision Node Guide." (Year: 2024).*
Raffi Shahabazian, "ISV Architecture Design and Scaling Options Using Local Peering Gateways and Dynamic Routing Gateways," Principal Cloud Network Architect, Jan. 10, 2023. (Year: 2023).*
"Virtual Network Gateways routing in Azure," Posted on Feb. 6, 2023 by erjosito. (Year: 2023).*
Atiek Arian, et al., "Crypto market-making latency and Amazon EC2 shared placement groups," Jan. 2023, AWS Blog, pp. 1-13.
U.S. Appl. No. 18/622,316, filed Mar. 29, 2024, Baihu Qian.

* cited by examiner

Obtain, e.g., via a programmatic request directed to a control plane server (CPS) of a VCS, an indication of network traffic requirements of a latency-sensitive application group (LSAG), including latency-related requirements such as latency variation limits for delivering replicas of application data messages from a message producer (MP) of an LSAG to members of a message consumer group (MCG) (e.g., using multicast) 901

Configure, by the CPS, a multi-node scalable virtual gateway SVG1 for handling at least the message replication traffic of the LSAG; SVG1 may include a set of routing decisions nodes (RDNs) and a set of packet processing nodes (PPNs), with the RDNs providing guidelines/rules/directives to the PPNs as to the operations (such as replicating received packets) the PPNs are to perform with respect to received packets 904

Obtain, at one or more of the RDNs, e.g., from the CPS, (a) an indication of an initial configuration of the LSAG, indicating an initial membership of the MCG and at least one message producer and (b) the traffic requirements 907

An RDN performs a series of routing adjustment iterations (RAIs) (e.g., once every N seconds, where N is a parameter chosen at the VCS); in a given RAI, the RDN uses recently-collected latency metrics for message transfers between various PPNs, along with other data such as the latency-related performance requirements to:

(a) construct/update/re-verify a replication graph RG whose vertices represent PPNs of SVG1 and whose directed edges indicate the destinations (e.g., other PPNs, or members of the MCG) to which replicas of the messages received at the PPNs are to be sent, with at least one PPN of RG serves as an entry point of SVG1 for receiving messages from an MP of the LSAG; RG may be constructed such that end-to-end estimated latencies for the replication pathways in RG satisfy the requirements, and (b) transmit, if needed, a respective updated replication directive to various PPNs of SVG1, which includes at least a portion of the RG, and may include a buffering requirement for replicas directed by a PPN to one or more destinations and/or an order in which various replicas should be sent from the PPN to the destinations 910

After a given PPN receives a replication directive, it performs the message replication-related actions that are indicated in the directive, including transmitting one or more replicas of each application data message that it receives to respective destinations, based on the directed edges indicated in the RG 913

FIG. 9

MESSAGE REPLICATION LATENCY MANAGEMENT USING SCALABLE VIRTUAL GATEWAYS

BACKGROUND

As demand for virtualization-based services at cloud provider networks has grown, more and more networking and interconnectivity-related features have been added to the services. For example, isolated virtual networks referred to as virtual private clouds (VPCs) comprising virtual machines can be established on behalf of customers, and a variety of logical gateways (such as Internet gateways for traffic between VPCs and the public Internet, virtual private network (VPN) gateways for traffic between VPCs and customer premises via VPN tunnels, and the like) can be set up. As the networking needs of customer applications continue to evolve, new networking capabilities can be added to support the applications.

BRIEF DESCRIPTION OF DRAWINGS

FIG. 9 is a flow diagram illustrating aspects of operations, pertaining to the management of message replication latencies, which may be performed at a cloud computing environment, according to at least some embodiments.

Figure 1:
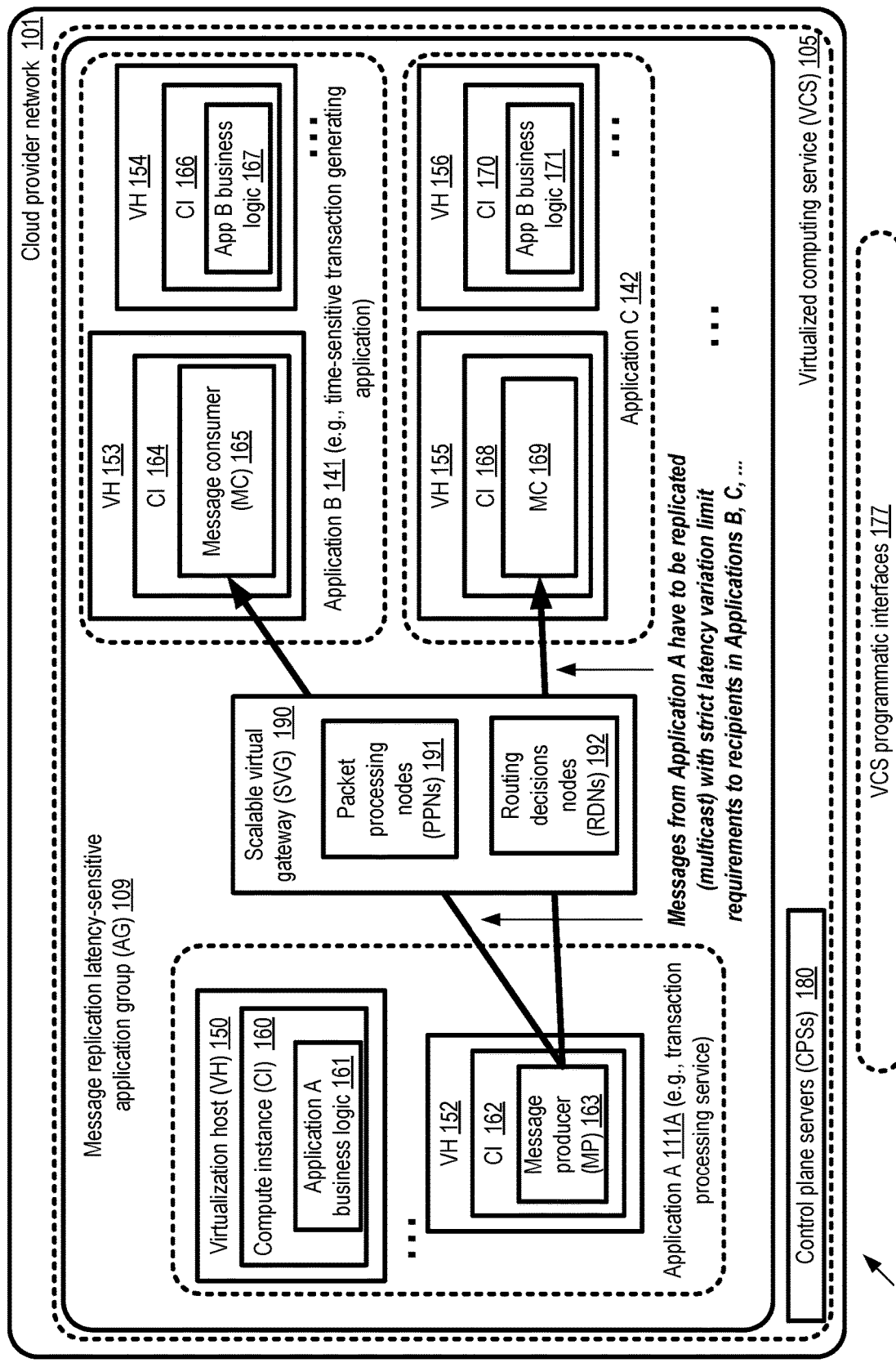
FIG. 1 illustrates an example system environment in which multi-node scalable virtual gateways may be configured at a cloud provider network to support requirements for limiting variation in message replication latencies for latency-sensitive applications implemented within the cloud, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

Many types of applications have stringent latency constraints regarding the transmission of network messages. For some types of applications, copies of messages generated at one component of an application have to be replicated as rapidly as possible to numerous message consumers, as the messages may trigger time-sensitive responsive actions by some or all of the consumers or associated application components. For example, a completion of a transaction of a particular type at a transaction processing service may have to be reported to multiple entities which may analyze the completed transaction (potentially along with other similar completed transactions) and quickly decide if a follow-up transaction should be initiated. In another example, respective messages indicating that a particular action within a multi-player game has been completed by one player of a group of multiple players may have to be propagated to other players. Replication of network messages to multiple recipients/consumers can also be referred to as "multicasting", and the collection of recipients/consumers can be referred to as a multicast group. In order to achieve a desired level of fairness or equity among the message consumers, the difference in the end-to-end time taken to replicate the messages to the various consumers (i.e., the time between the generation of a message at a message producer, and the time at which respective replicas of that message are received at the different consumers) has to be minimized. Such differences can be referred to as massage replication latency variation or MRLV. For at least some latency-sensitive applications or groups of related applications, one of the key business objectives is to minimize (e.g., to within a few milliseconds or microseconds depending on the application) MRLV. Other latency-sensitive application tasks can simply require minimization of latency for various types of message transfers, regardless of whether the messages are being replicated or not.

One conventional approach towards minimizing MRLV is to co-locate all the application components involved (including the message producers and all the replica consumers) at a single premise, and even use special-purpose hardware (including for example cables of equal length connecting the message producer with each consumer, so that the message replicas do not have to travel over different lengths of cables). However, this approach does not scale as the number of consumers increases, and can be prohibitively expensive even for relatively small numbers of consumers, depending on the details of the applications involved and the stringency of the latency-related requirements.

The above challenges, among others, are addressed by the disclosed embodiments. One embodiment relates to relates to techniques for optimizing the placement, within a compute service, of transit gateway nodes based on the customer-specified placement groups for their compute instances. Not following a specific placement strategy for such nodes can lead to their random placement on hosts, potentially far from the compute instances to which they direct traffic. This can result in increased latency and latency variation for application traffic. The disclosed techniques ensure that when a customer requests a transit gateway for compute instances within a cluster placement group, indicating latency-sensitive applications, the compute service control plane places the transit gateway nodes in the same spine cell as the customer compute instances. This co-location reduces latency and latency variation for traffic transmitted via the transit gateway, benefiting applications that require consistent low latency, such as financial exchange applications.

Another embodiment relates to techniques for minimizing latency variations among recipients of a multicast flow in a compute service, addressing the need for fair and equal access to transaction data in financial applications such as exchange-related applications. To achieve fairness and prevent unfair advantages due to timing differences in receiving and analyzing data, a logical "exchange gateway" is created. This gateway includes multiple packet replicating nodes arranged in a balanced replication tree, where the edges represent paths to the multicast group recipients. A decision node iteratively analyzes node-to-node latency metrics and updates the tree to minimize latency variation for replicating application data among the multicast group members. Additionally, the order in which replicating nodes transmit message replicas can be adjusted, and nodes can temporarily buffer messages to meet desired latency variation objectives. These techniques enable the service provider to satisfy stringent latency requirements for many application classes without the need for the expensive on-premises equipment that is currently required.

The present disclosure relates in part to methods and apparatus for achieving MRLV minimization in a scenario in which the programs implementing various components of the applications, including message producers as well as message replica consumers, are run using resources of a cloud provider network. In addition, methods and apparatus for more general-purpose latency reduction using intelligent placement of nodes of networking intermediary devices for traffic flows which do not necessarily require replication or multicasting are described. Multi-node scalable virtual gateways, implemented using software-defined networking and cloud computing hardware, can be established for processing the traffic of latency-sensitive applications. In scenarios in which messages are to be replicated, a given scalable virtual gateway (SVG) can serve as an intermediary between the message producer (or producers) and the message replica consumer group (or groups) of the applications, with replication pathways and routes among the constituent nodes of the SVG chosen dynamically so as to minimize or largely eliminate MRLV. The SVG can comprise at least two types of nodes: routing decisions nodes (RDNs) and packet processing nodes (PPNs). A PPN is responsible for implementing, with respect to application data packets that are received at the PPN, packet processing tasks (such as replicating the received messages and sending the replicas on to respective destinations) indicated in routing directives or rules provided by the RDNs. The RDNs can make decisions regarding the details of the packet processing tasks that should be performed on application data packets at each PPN, based on application requirements and information collected about the current state of the network, and provide such details to the PPN in directives. Messages or packets generated at a message producer can be received at a selected PPN of the SVG, and replicated iteratively via paths which include some number of other PPNs of the SVG to the desired set of consumers. SVGs can also be used as intermediaries to perform other kinds of packet processing tasks than replication, such as network address translation and the like.

For workloads whose messages require replication, a latency-based replication graph can be constructed (and adjusted as needed, e.g., based on changing network conditions) by an RDN to manage the propagation of message replicas while minimizing MRLV and/or meeting other performance goals of the applications. The terms "message" and "packet" are used synonymously herein, although the techniques described can be adapted and used with equal success in scenarios in which a given message may be split into multiple packets due to packet size limitations of the networking protocols being used. In addition to the performance goals themselves, a number of other factors can be used by the RDN to construct or update such a graph, including for example recently-collected metrics of latency for transmitting messages between various pairs of PPNs of the SVG, health status of the PPNs of the SVG, connectivity details such as the number of hops between different PPNs and various replica consumers, and so on. A given version of the graph, corresponding for example to one of multiple routing adjustment iterations performed by an RDN, can include some number of vertices representing respective PPNs, and directed edges linking pairs of PPNs. The direction of an edge can indicate the destinations to which replicas of received application data messages are to be transmitted by the PPN represented by the origin vertex of that directed edge. At least one of the vertices in the graph (referred to as an entry vertex) can represent an entry or ingestion PPN which has been designated by the RDN to receive application data messages from a message producer, while some number of other vertices (referred to as exit vertices) can represent respective designated exit PPNs responsible for sending replicas of application data messages to the consumer members of the multicast group. Given the latency metrics available to the RDN, the graph may be constructed in such a way that the respective estimated end-to-end latencies for replicating messages from the producer to the members of the consumer group, using the paths comprising the directed edges of the graph, satisfy the latency-related requirements (e.g., satisfy MRLV minimization requirements). After the graph is constructed during a given routing adjustment iteration by an RDN, the RDN can send a respective replication directive to one or more of the PPNs of the SVG. A given replication directive can include, for example, at least a portion of the most recent version of the graph (which informs the receiving PPN of the destinations to which respective replicas of received application data packets are to be sent). In some cases, the replication directive can also include other types of instructions or guidelines, such as a preferred order in which replicas should be sent to multiple destinations (if there are multiple destinations indicated in the graph), and/or buffering parameters for delaying transmission if replicas in some cases.

A given PPN of the SVG can receive the replication directive including the portion of the graph, and implement the actions/tasks/operations indicated in the directive. For a given application data packet which is received (which may itself be a replica that was generated at another PPN, depending on the position of the receiving PPN in the graph), the PPN can prepare and send at least one replica to a destination indicated in the graph.

The RDN can perform multiple routing adjustment iterations over time, e.g., once every N seconds according to a pre-determined schedule, or based on various triggering conditions or events such as changes in the number of message consumers to which messages are to be replicated. In some cases, the updated latency data collected and analyzed by the RDN for the iteration, as well as the other factors being taken into consideration for preparation of the replication directive, may indicate that no changes are needed to the earlier replication directive sent to a given PPN in a previous iteration, and as a result an updated directive need not be sent. The granularity at which the graphs and directives are prepared by an RDN can vary—in some cases, for example, a given series of directives and their constituent graph versions can be constructed for a given packet flow, where packet flows are distinguished from one another by a tuple comprising at least (source Internet Protocol (IP) address, destination IP address, source port, destination port). In other cases, a given series of directives and graph versions may apply to multiple flows. The replication graphs can also be referred to as replication trees.

In some cases, control plane or administrative components of a computing service or a networking service of a cloud provider network or cloud computing environment may be responsible for the initial configuration of an SVG (e.g., the number of PPNs and/or RDNs included, the specific hosts or servers at which the PPNs and RDNs are to run, etc.), as well as for dynamically adjusting/scaling the configuration of the SVG as application workload changes and/or other events such as failures of PPNs/RDNs occur. The initial configuration can for example be chosen based on receiving e.g., via programmatic interfaces from a client, the performance requirements (including latency-related requirements) of an application group which requires messages to be replicated. New PPNs and/or new RDNs can be added to an SVN based on various metrics collected from the SVN and/or based on requests from a client on whose behalf the SVN was set up. Latency measurements collected from the applications can be provided to clients upon request, e.g., via the programmatic interfaces, to help clients verify the extent to which the latency-related requirements of their applications are being satisfied in practice.

Some cloud provider networks at which latency-sensitive applications are run can enable clients to specify placement policies for the compute instances or virtual machines at which the applications are executed. A client can, for example, request that a set of compute instances of the client should be run in a latency-sensitive placement group, whose associated placement policy indicates that virtualization hosts for the compute instances should as far as possible be selected in physical locations near to one another, such that the latency for messages transferred between the compute instances of the group is minimized. Such a placement policy can be referred to as a cluster placement policy. The data centers of the cloud provider network can be organized in network cells, with each of the network cells comprising a respective collection of networking infrastructure and virtualization hosts which are located close to one another within a portion of a data center. Due to the co-location, which typically results in fairly short physical network paths (e.g., with a shorter total length of cables traversed, and/or with fewer intermediary devices such as switches traversed) between the virtualization hosts, latency for transferring network messages among virtualization hosts of a given network cell can in general be lower than latency for transferring network messages between virtualization hosts of different network cells.

A control plane server of the cloud provider network can receive a placement policy indicating latency preferences of a client regarding messages that will be sent between compute instances of the client. The preferences can enable the control plane server to place the compute instances on virtualization hosts selected in such a way that the latency preferences are more likely to be satisfied. In accordance with the specified policy, the control plane server can launch one set of compute instances of a particular isolated virtual network (IVN) (also referred to as a virtual private cloud or VPC) at a group of virtualization hosts of a particular network cell. A second set of compute instances, configured within a second IVN/VPC, can also be launched at a group of virtualization hosts of the same network cell in accordance with the policy. Each of the VPCs can have a respective range of private network addresses (e.g., network addresses that are not advertised outside the VPC, and cannot by default be accessed from outside the VPC), and each of the compute instances can be assigned a respective private address from the range of its VPC.

The control plane server can receive a request to establish or configure an SVG for transmitting network messages between the compute instances in the two VPCs. In some cases in which the compute instances of the two VPCs are in the same placement group (e.g., a placement group indicated via a parameter in a launch command for the compute instances), an identifier of the placement group or an associated placement policy can be included as a parameter of the SVG configuration request. In response to the request, the control plane server can select, for running nodes of the SVG (such as PPNs and/or RDNs of the kind introduced above, implemented at respective compute instances or virtual machines), virtualization hosts in the same network cell as the compute instances whose traffic is to be processed using the SVG. The nodes can then be run at the selected hosts and perform packet processing tasks on packets which originate at compute instances in one of the VPCs and are directed to compute instances in the other VPC. In some cases, the packet processing tasks can include replication of messages as described above, with replication graphs being constructed and updated as needed to minimize MLRV. In other cases, packet processing tasks other than replication can be performed using the SVG nodes which are run in the same network cell as the sources/destinations of the traffic. If the control plane server determines that the level of traffic between the two VPCs has increased and additional nodes are needed for the SVG to handle the increased traffic, those additional nodes can also be launched at virtualization hosts within the same network cell.

A placement group and an associated placement policy can typically initially be associated with a cloud provider network customer account of the client at whose request the placement group is set up. In some cases, a latency sensitive application group can include applications associated with several customer accounts. The cloud provider network can implement programmatic interfaces that enable a client on whose behalf a placement group with an associated placement policy is created to share the placement group/policy with another customer account. After the placement group is shared, the client with the other customer account can request launches of compute instances in the same placement group, and SVGs set up using the network cells of the placement group can also be used for the traffic of such compute instances.

In some cases, a client can request the establishment of an SVG before requesting the creation of a placement group and its compute instances. In such cases, one or more nodes of the SVG may already have been launched before the compute instances of the latency-sensitive applications that are run within the placement group are launched. In such a scenario, if the pre-existing nodes of the SVG happen to use virtualization hosts that are not in the same network cell as the compute instances whose traffic is to be processed by the SVG, the control plane of the cloud provider network can migrate the virtual machines used for nodes of the SVG to virtualization hosts within the network cell.

A provider network data center can sometimes be organized as a hierarchy of network cells. A cell at one of the layers of the hierarchy can be referred to as a spine cell, and a given spine cell can comprise multiple "child" or lower-level cells referred to as access cells. A given access cell can in turn comprise some number of racks of virtualization hosts, located close to one another in a portion of the data center. Latency for messages transmitted between resources within a given access cell can in general be lower than latency for messages transmitted across access cells of a given spine cell, and latency for messages transmitted between resources within a given spine cell can in general be lower than latency for messages transmitted across spine cells. The selection of resources for clients' compute instances and/or SVG nodes can take the hierarchy into account in some embodiments. For example, a best effort can be made to place all compute instances of a latency-sensitive placement group (and compute instances used for an associated SVG's nodes) within a single access cell, but if this is not feasible due to capacity constraints, some of the compute instances can be placed in a nearly access cell within the same parent spine cell. In some cases, if there is sufficient capacity to run the PPNs of the SVG within the same network cell as the traffic sources and destinations, but insufficient capacity to run RDNs, the RDNs (which are in general used less frequently in high-traffic conditions than the PPNs) can be run in a different network cell.

As one skilled in the art will appreciate in light of this disclosure, certain embodiments may be capable of achieving various advantages, including some or all of the following: (a) supporting stringent latency-related performance requirements of applications run at cloud computing environments, regardless of changes to application workload levels, without requiring custom hardware or other less flexible solutions and/or (b) enabling large numbers of message consumers (multicast group members) to be added rapidly for various applications without impacting latencies.

According to some embodiments, a system may include one or more control plane servers (CPSs) of a service such as a virtualized computing service (VCS) of a cloud computing environment, and a set of virtualization hosts of the service. A CPS may be configured to receive, via one or more programmatic interfaces, e.g., from a VCS client, message replication performance requirements of a latency-sensitive application group (LSAG). The LSAG may include a message producer whose application data messages are to be replicated to a set of message consumers. The message producer and the message consumers may each run on respective ones of the virtualization hosts (e.g., within respective compute instances or virtual machines at the virtualization hosts) in some embodiments. The message replication performance requirements may include a target latency variation metric for replication of application data messages from the message producer to individual ones of the message consumers in at least some embodiments. The metric may be expressed in various ways in different embodiments. In one example, the metric may be specified using the equivalent of the following: "the difference between the largest measured message replication latency among the consumers on any given day, and the smallest measured message replication latency on that day, is not to exceed X", where X is expressed in units such as milliseconds. In another example, the metric may be specified using statistics such as standard deviations, variances, and the like of the measured latencies, or using percentages instead of absolute time units.

In various embodiments, the CPS may establish, based at least in part on the message replication performance requirements, a scalable virtual gateway (SVG) to receive application data messages from the message producer and transmit replicas of the application data messages to the set of message consumers. Virtual gateways may also be referred to as virtual routers, virtual transit gateways, and/or virtual traffic hubs. The SVG may comprise a plurality of nodes including (a) one or more routing decisions nodes (RDN) and (b) a collection of packet processing nodes (PPNs). In some embodiments, individual ones of the PPNs and/or RDNs may run on respective virtualization hosts. The CPS may transmit the message replication performance requirements to the RDNs in at least some embodiments.

An RDN of the SVG may perform a plurality of routing adjustment iterations (RAIs) in various embodiments. In a given RAI, the RDN may analyze a set of recently-gathered or recently-updated latency metrics, including latency metrics for messages transmitted between at least some pairs of PPNs of the collection. The latency metrics may have been collected since the previous RAI in some implementations, e.g., using special measurement-only messages (as opposed to application data messages) transmitted among the PPNs at the request of the RDN. During the RAI, the RDN may generate, based at least in part on the message replication performance requirements and the set of latency metrics, a replication graph (RG). The RG may include a plurality of vertices and a plurality of directed edges linking respective pairs of vertices. Individual ones of the vertices may represent respective PPNs in various embodiments. A directed edge linking a PPN (e.g., PPN-a) to another PPN (e.g., PPN-b) may indicate that a respective replica of various application data messages received at PPN-a are to be sent by PPN-a to PPN-b (i.e., PPN-a is to replicate, to PPN-b, application data messages which are received at PPN-a). The RG may include an entry vertex and a plurality of exit vertices in some embodiments. The entry vertex may represent a PPN which is to receive application data messages from the message producer, while a particular exit vertex may represent a PPN which is to transmit a replica of a received application data message to a particular message consumer. The RDN may generate the RG in such a way that respective estimated end-to-end latencies for replicating application data messages from the message producer to individual ones of the message consumers via paths which are represented by directed edges of the RG satisfy the target latency variation metric and/or other performance requirements of the application group in various embodiments. Having constructed the RG, the RDN may transmit, to individual ones of the PPNs of the SVG, respective replication directives which include at least a portion of the RG which is relevant to the PPN (i.e., a portion of the RG which indicates the destinations to which the PPN should send application data message replicas, but may not necessarily include portions of the RG which indicate destinations of message replicas which are to be sent by other PPNs).

After a PPN of the SVG receives a given replication directive corresponding to an RAI, it may act upon the information contained in it, and continue acting upon that information, until it receives another directive (e.g., a directive prepared by the RDN in a subsequent RAI) in various embodiments. For example, the PPN may transmit a replica of an application data message that it (the PPN) receives to a destination (e.g., another PPN or a message consumer) indicated in the replication directive.

In some embodiments, when a PPN has to send replicas of a received application data message to multiple destinations, those replicas may be sent in sequence rather than in parallel. If, for example, three replicas R1, R2 and R3 of a given application data message M1 have to be sent to three destinations D1, D2 and D3 (such as three other PPNs or three message consumers) from a PPN P1, R1 may be sent to D1 first (that is, local processing tasks at P1 that are needed to transmit R1 may be completed first, taking some number of microseconds), then R2 may be sent to D1 (consuming some more microseconds), and finally R3 may be sent to D3. In such scenarios, the order or sequence in which the replicas are sent at various PPNs may impact the end-to-end latencies for replicating the messages to the message consumers. As such, in some embodiments the elapsed time for the operations performed at the PPNs for message replication may be taken into account by an RDN when it generates replication directives, in addition to the over-the-network message transmission latencies. In various embodiments, an RDN may obtain (e.g., based on measurements/timestamps collected at the PPNs) an estimate of an expected elapsed time for operations performed at the various PPNs to generate and transmit a replica of an application data message. The RDN may use this elapsed time information, along with the latency-related performance requirements and the inter-PPN latency metrics, to decide an order or sequence in which a given PPN should send its outbound replicas of application data messages. The order/sequence information may be included in the replication directives, and the PPNs may send replicas in the order indicated in the directives. In the above example, based on the order included in a directive from an RDN, P1 may send the replicas in the order R2, R1, R3, for example, to D2, D1 and D3 respectively.

In at least one embodiment, depending on the differences in the latency metrics and/or estimated local processing elapsed times for different PPNs, and depending on the latency-related performance requirements of the applications, an RDN may command or request that a given PPN defer or delay transmission of a replica to one or more destinations. For example, a replication directive sent to a given PPN during a given RAI may include a buffering duration parameter for replicas to be sent from that PPN to a given destination, and that PPN may store a replica of an application data message in a buffer for the specified duration before sending the replica to that destination. This type of buffering can also help reduce latency differences for the different recipients.

In order to achieve the latency-related objectives of some types of applications, it may be beneficial to synchronize the local clocks at the hosts and/or virtual machines used for the application components and/or the SVGs (e.g., to within a few microseconds or even finer granularity). In at least some embodiments, a cloud provider network may include a time synchronization service for achieving such close clock synchronization for at least a subset of the virtualization hosts of a VCS of the cloud provider network. In various embodiments, a set of hosts that are to be used for running PPNs and/or components of latency-sensitive application groups may be selected such that the hosts satisfy a clock synchronization criterion. The latency metrics for packets transmitted between the PPNs and/or other components may be collected using timestamps generated using the synchronized local clocks in such embodiments. To accomplish the synchronization of local clocks, in some implementations the time synchronization service may deploy a dedicated network infrastructure for delivering highly accurate timing signals sourced from GNSS (Global Navigation Satellite Systems) receivers to various hosts, and to virtual machines running on the hosts. In at least one embodiment, the synchronized local clocks may be implemented or maintained within virtualization management components (e.g., virtualization management offloading cards) of the virtualization hosts of a VCS.

As indicated earlier, latency-sensitive application groups for several different application domains may be implemented using the techniques introduced above. In some embodiments, for example, such an application group may include a financial transaction processing application, a distributed game-playing application, or a digital advertising application. In some cases, when a message consumer (which may be a component of one application App1 of the application group) receives a replica of an application data message M1 sent from a message producer (which may be a component of another application App2 of the application group) via an SVG SVG1, the replica may indicate a completion of a particular transaction T1 at App2. A time-sensitive analysis of the M1 replica may be performed at App1, and a request for another transaction T2 may be sent to App2 (e.g., also using resources of the provider network, such as another SVG SVG2 or the same SVH SVG1) based on the results of the analysis.

In at least some embodiments, a set of virtualization hosts used for PPNs and/or RDNs of an SVG configured for an application group may be selected by the control plane of a VCS based at least in part on respective physical locations of the hosts. For example, hosts that are physically close to the hosts that are used for the application group components may be chosen. In various embodiments, the number of network hops that are needed to transfer a message from a given PPN to a given message consumer of the application group may differ from the number of network hops needed to transfer a similar message from a different PPN to the same message consumer. Such hop count information may be used by an RDN to generate a replication graph in some embodiments—e.g., PPNs from which messages require a single hop (or a small number of hops) to reach the consumers may be selected as exit PPNs in preference to other PPNs.

Additional consumers may be dynamically added (e.g., based on programmatic requests from the clients on whose behalf an SVG was established) at any time to the group of message replica consumers of an application group, and the VCS control plane servers may automatically increase the count of PPNs and/or RDNs accordingly. Similarly, consumers may be removed dynamically, and the SVG configurations may also be adjusted downwards automatically by the VCS control plane in some cases.

Replication adjustment iterations (RAIs) of the kind indicated above may be initiated based on various triggering conditions in different embodiments. For example, in some embodiments, a new RAI may be started by default once every N seconds. In one embodiment, events such as the addition or removal of message consumers, detection of failures at PPNs, etc. may trigger RAIs. In various embodiments, measurements of actual application data message replication latencies may be collected and analyzed. If the measurements indicate that the latency-related requirements of the application group are either not being met, or are likely to not be met in the near future, the frequency at which RAIs are initiated may be increased (that is, new replication graphs may be generated more frequently) in some embodiments, and/or the SVG configuration may be modified (e.g., by adding more computationally powerful PPNs, e.g., using compute instances of a different family among a group of compute instance families of the VCS, and so on.)

According to some embodiments, a system may include one or more control plane servers (CPSs) of a service such as a virtualized computing service (VCS) of a cloud computing environment, and a set of network cells of the cloud computing environment. Individual ones of the network cells may comprise a respective collection of virtualization hosts that are co-located within a portion of a data center, such that latency for transferring network messages among virtualization hosts of a given network cell is lower than latency for transferring network messages between virtualization hosts of distinct network cells. Prior to launching at least some virtual machines (VMs) or compute instances of a client of the cloud computing environment, a CPS may receive a VM placement policy from the client via one or more programmatic interfaces. The policy may indicate latency preferences pertaining to the transmission of messages or packets between the virtual machines of the client and/or the transmission of messages between the client's VMs and another client's VMs. In accordance with the policy, the CPSs may launch a first group of VMs at a first group of hosts of a particular network cell. The first group of VMs may be assigned network addresses within a first private address range of a first VPC in some embodiments. A second group of VMs may also be launched using hosts of the particular network cell, e.g., based on the same policy. The VMs of the second group may be assigned network addresses within a second private address range of a second VPC—e.g., either a VPC created at the request of the same client on whose behalf the first VPC was created, or a VPC created for a different client. The policy may be shared between cloud customer accounts of the different clients in some embodiments, e.g., in response to programmatic input from the client on whose behalf the policy was created. In one embodiment, the cloud computing environment may implement programmatic interfaces which can be used by clients to create latency-sensitive placement groups, which are logical constructs providing hints to the cloud computing environment services regarding preferred placement of resources such as VMs, and respective placement policies may be associated with different placement groups.

A CPS may determine that an SVG (comprising nodes such as the RDNs and PPNs introduced above) is to be configured or established for traffic flowing between groups of VMs for which hosts have been selected from a given network cell using a client-specified VM placement policy in various embodiments. The CPS may then cause at least some nodes of the SVG to also be run at hosts within the same network cells. For example, at least some PPNs may be executed within VMs launched on such hosts. One such PPN may receive packets directed from a VM in one of the VM groups to a VM in a second VM group, and perform one or more packet processing tasks on the packet. In at least some embodiments, the packet processing tasks may include replicating the packet to a set of destinations, such as another PPN of a replication graph generated by an RDN of the SVG, or to a message consumer VM.

In some embodiments, the CPS may be informed, via a parameter of an SVG creation request, about the placement policy or placement group for whose traffic the SVG is intended. In at least one embodiment, an SVG may be created, and a set of the SVG's nodes may be placed at various hosts, before a client informs the CPSs that that SVG is going to be used for traffic of VMs for which a placement policy is in use. In the latter scenario, after the CPSs determine that the SVG is going to be used for such VMs, one or more VMs used as nodes of the SVG may be migrated to hosts within the same network cell as at least some of the VMs whose traffic is going to be processed using the SVG. In some scenarios, if/when nodes are added to the SVG, they may be run using VMs on hosts within the network cells being used for the VMs of the traffic sources/destinations. In one embodiment, while one or more PPNs (or all of the PPNs) of an SVG may be run at the same network cell as the traffic sources/destinations, one or more of the RDNs may be run at a different network cell. An RDN could be run at a different cell in some cases in response to a determination by the CPS that an available computing capacity of the original network cell (the cell within which the PPNs were launched) has decreased beyond a threshold, or would reach the threshold if the RDN were to be launched in the original network cell. In other embodiments, all RDNs and all PPNs of the SVG may be run using hosts within the network cell used for traffic sources/destinations. In some embodiments, if one set of VMs of a latency-sensitive application group is run on hosts within a particular network cell, and a second set of VMs is run on hosts which are not in that network cell, some or all nodes of an SVG used for transmitting packets between the two sets of VMs may still beneficially be run in the particular network cell. As such, as long as nodes of an SVG are placed in the same network cell as at least some of the communicating entities whose traffic is processed at the SVG, latency benefits may be achieved for the traffic to/from communicating entities.

As indicated earlier, in at least some embodiments, SVGs and latency-sensitive application groups may be implemented at a VCS of a cloud provider network. A cloud provider network or cloud computing environment (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

The traffic and operations of the cloud provider network (or individual services of the cloud provider network, including the VCS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which multi-node scalable virtual gateways may be configured at a cloud provider network to support requirements for limiting variation in message replication latencies for latency-sensitive applications implemented within the cloud, according to at least some embodiments. As shown, system 100 includes resources and artifacts of a virtualized computing service (VCS) 105 of a cloud computing environment or cloud provider network 101, being used to implement a message replication latency-sensitive application group AG 109. The VCS may include a set of control plane servers (CPSs) 180 and a fleet of virtualization hosts. The VCS may implement a set of programmatic interfaces 177, such as one or web-based consoles, application programming interfaces (APIs), command-line tools, graphical user interfaces and the like, which can be used by clients or customers of the VCS to submit requests and receive corresponding responses. Such clients may include owners of various applications of AG 109, such as application A 111A, application B 141, or application C 142.

In the example scenario depicted in FIG. 1, respective components of applications A, B and C of AG 109 may be run using compute instances (CIs) at virtualization hosts (VHs) of the VCS. Application A may comprise a message source or message producer (MP) 163, e.g., comprising one or more programs running at CI 162 of VH 152 that generate application data messages, as well as one or more programs implementing application A business logic 161 at CI 160 or VH 150. The messages generated or produced by MP 163 may have to be replicated to (i.e., replicas of messages generated by the message producer 163 may have to be sent to) numerous message consumers (MCs) of other applications of the AG 109. Such MCs may include, for example, MC 165 of application B, running at CI 164 of VH 153, as well as MC 169 of application C, running at CI 168 of VH 155. Individual ones of the MCs may comprise one or more programs. Application B business logic 167 may be implemented at one or more CIs such as CI 166 at VH 154, while application C business logic 171 may run at CI 170 of VH 156 in the depicted scenario. In some cases, applications such as application A, application B or application C may be run on behalf of different customers or clients of the VCS— e.g., application A may be run on behalf of client C1, application B may be run on behalf of client C2, and so on. In other cases, several of the applications that form part of an AG may be run on behalf of the same customer. In one example, application A may comprise a transaction processing service, and the messages generated by message producer 163 may include at least some messages which indicate the completions of respective transactions. In such an example, application B or application C may be a time-sensitive transaction generating application, with new transactions potentially being generated based on analysis of messages received at their respective MCs. Note that while only two applications comprising one MC each are shown in the example scenario of FIG. 1, in general a given AG may include numerous applications with respective sets of one or more MCs. In some cases, message producers and at least some message consumers may be part of the same application.

A CPS 180 may receive an indication of message replication performance requirements of AG 109 in the depicted embodiment via programmatic interfaces 177, e.g., from the client on whose behalf one or more of the applications of AG 109 are implemented. The performance requirements may include, among others, a target latency variation metric for replication or multicasting of application data messages from application A to various other applications such as applications B and C. Such a metric may, for example, indicate a desired upper limit on the difference in the time taken to receive respective replicas of the same message from MP 163 at the different MCs 165 and 169. Other types of latency-related target metrics may also be included in some embodiments in the performance requirements, such as upper limits on the absolute replication latency for any given message, target limits on statistics (such as variance or standard deviation) pertaining to the variation in latency for replicas of the same message or different messages, and so on.

In order to help satisfy, and based at least in part on, the performance requirements, a CPS may establish a multi-node scalable virtual gateway (SVG) 190 in the depicted embodiment. SVG 190 may include a collection of packet processing nodes (PPNs) 191 and one or more routing decisions nodes (RDNs) 192. The PPNs may implement packet processing tasks for messages/packets of various packet flows of the applications of AG 109, based on directives received from the RDNs; the RDNs may generate such directives based on the application requirements and changing network conditions as described in further detail below. The PPNs and/or RDNs may also be implemented using compute instances on virtualization hosts of the VCS in some embodiments. The CPS may transmit the message replication performance requirements of AG 109 to one or more of the RDNs in various embodiments. In addition, other configuration related data may also be provided to the RDNs from the VCS control plane, such as information about the number of network hops between individual PPNs and the MPs/MCs, health status information about the PPNs (which may change over time), and so on.

An RDN may perform a sequence of routing adjustment iterations (RAIs) in the depicted embodiment. In a given RAI, an RDN may analyze a set of latency metrics, including latency metrics for packets transmitted between at least some pairs of PPCs of the SVG. Based at least in part on the latency metrics and the message replication performance requirements, the RDN may construct, generate or update a replication graph (RG) in at least some of the RAIs. The RG may include a plurality of vertices and a plurality of directed edges linking respective pairs of vertices. Individual ones of the vertices represent may respective PPNs, while a directed edge linking one PPN PPN-a to another PPN PPN-b may indicate that application data messages received at PPN are to be replicated by PPN-a to PPN-b; as such, the directed edges collectively may define the logical paths whereby messages from MP 163 are to be replicated or multicast to MCs such as MC 165 and MC 169. The RG may include at least one entry vertex and a plurality of exit vertices in various embodiments. The entry vertex may represent a PPN which is to receive application data messages from an MP such as MP 163, while a given exit vertex may represent a PPN which is to transmit a replica of a received application data message to a particular MC such as MC 165 or MC 169. The RG may be generated by the RDN such that respective estimated end-to-end latencies for replicating application data messages from an MP such as MP 163 to individual ones of the MCs via paths which are represented by directed edges of the replication graph satisfy the target latency variation metrics indicated in the requirements. For example, when generating the RG the differences between (a) the sum of the estimated latencies corresponding to the directed edges taken to send a first replica of a message from MP 163 to MC 165 and (b) the sum of the estimated latencies corresponding to the directed edges taken to send a second replica of that message from MP 163 to MC 169 may be taken into account, in view of the latency variation related requirements. Other AG performance requirements may also be taken into account when constructing the RG.

Having constructed the RG in a given RAI, an RDN may transmit respective replication directives to the different PPNs, with individual ones of the directive including at least respective portions of the RG (or the entire RG) in various embodiments. In some cases, the replication directives may also include buffering instructions (command indicating the respective amounts of time various replicas should be buffered locally at the different PPNs before being sent on to destinations), and/or ordering information indicating the sequence in which different replicas should be sent to respective destinations from a given PPN. The ordering information may, for example, be based on measurements of elapsed times it takes to complete the processing tasks performed at a PPN for each replica it sends out. Buffering instructions may be based on the RDN determining that in order to provide the desired level of equity or fairness in message replication latency among MCs, some transmission of some replicas may need to be deferred or delayed at some PPNs. In at least some cases, the replication directives sent to different PPNs from a particular RDN during a given RAI may differ from one another—for example, different portions of the RG that was constructed or updated in the RAI may be included, different buffering or ordering parameters may be specified, and so on. Having received a replication directive, a PPN may proceed to act on it in various embodiments. For example, after it receives a replication directive RD1, a PPN PPN-a may send a replica of a received application data message to a destination (another PPN, or an MC) indicated in RD1.

In at least some embodiments, the VCS may provide a time synchronization feature or service that ensures that local clocks on the VHs used for the AG components and/or the SVG are synchronized to a desired level of accuracy. As such, the VHs that are used for the AG and/or for the SVG may be selected such that their local clocks meet a synchronization criterion, and timestamps generated using the synchronized clocks may be used for computing the latency metrics that are used for generating the RGs and/or other components of the replication directives. In at least some embodiments, the VHs used for the AGs and/or the SVGs may be selected at least partly based on their respective physical locations (e.g., within cloud provider network data centers)—e.g., hosts located relatively close to one another may be selected in preference to hosts located further away from each other. It is noted that while in FIG. 1, the message producer 163 and the message consumers 165 and 169 are shown as components of separate applications A, B and C respectively, in some embodiments messages generated by one component of an application may be replicated to other components of the same application using SVGs of the kind described above; as such, a latency-sensitive application group may comprise a single application in some cases.

Figure 2:
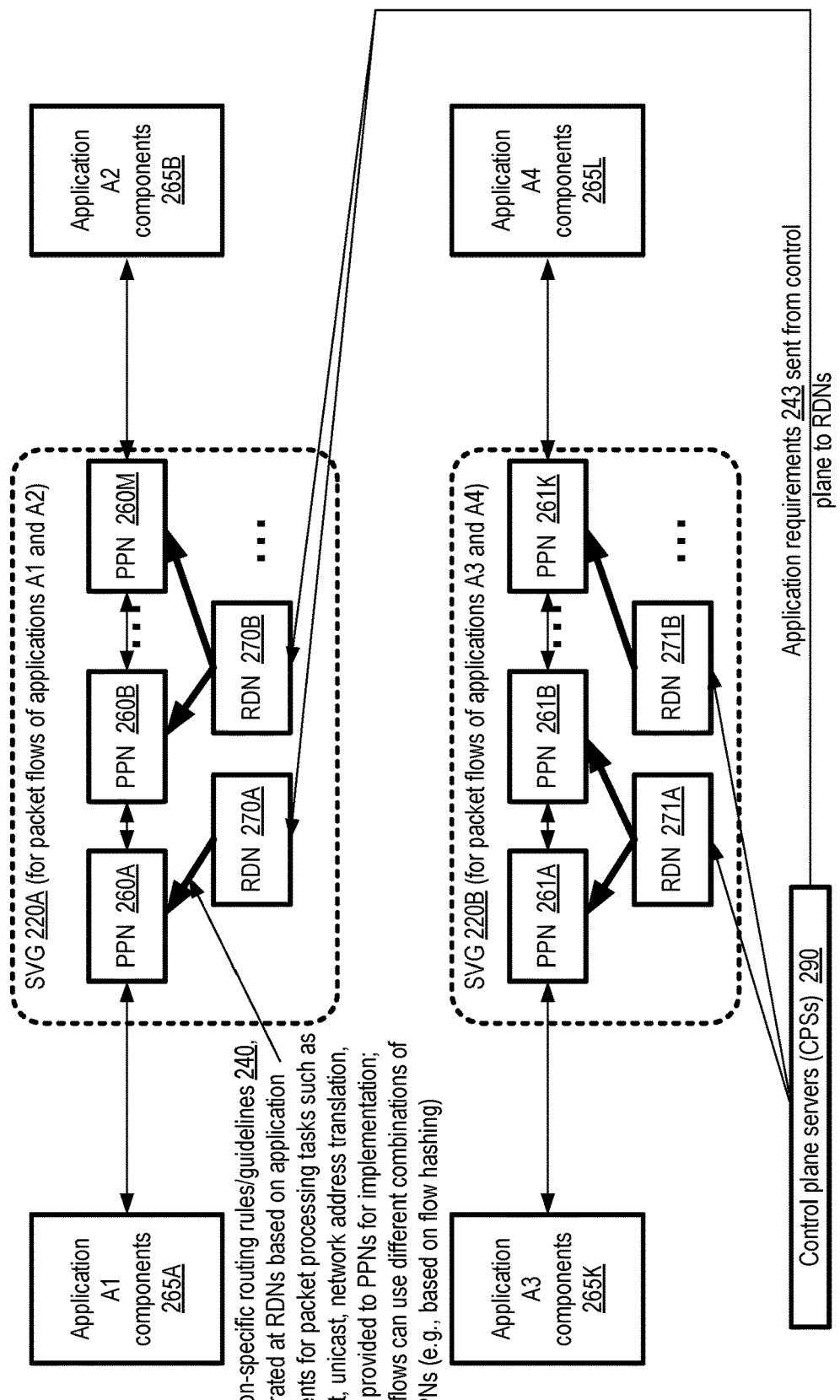
FIG. 2 illustrates example roles of constituent nodes of scalable virtual gateways which may be implemented at a packet processing service of a cloud provider network, according to at least some embodiments.

FIG. 2 illustrates example roles of constituent nodes of scalable virtual gateways which may be implemented at a packet processing service of a cloud provider network, according to at least some embodiments. In various embodiments, a VCS may include or implement a packet processing service (PPS) which can be used for a variety of packet processing tasks on behalf of the customers/clients of the VCS, and/or for internal operations of the VCS itself. Respective SVGs may be set up by the PPS for various groups of applications in such embodiments. For example, SVG 220A may be established for packets flowing between components of applications A1 and A2, while SVG 220B may be established for components of applications A3 and S4.

Control plane servers (CPSs) 290 of the VCS or the PPS may obtain information via programmatic interfaces from customers of the VCS in the depicted embodiment, indicating the connectivity needs of their applications, the specific kind of packet processing tasks that are needed for the applications (e.g., multicast, unicast, network address translation, etc.), and/or the performance (such as replication latency) requirements of the applications. Based on the needs of the applications, one or more SVGs may be set up by the CPSs 290 for each application or group of applications, with a given SVG initially comprising some number of PPNs and some number of RDNs. For example, SVG 220A, set up for traffic flowing between application A1 components 265A and application A2 components 265B, may include PPNs 260A, 260B and 260M and RDNs 270A and 270B in the depicted scenario. Similarly, SVG 220B, set up for traffic flowing between application A3 components 265K and application A4 components 265L, may include PPNs 261A, 261B and 261K and RDNs 271A and 271B in the depicted scenario.

The RDNs of individual ones of the SVGs may be provided the application requirements 243 by the CPSs in the depicted embodiment. Based on the requirements, the RDNs may generate application-specific routing rules/guidelines 240 and transmit the rules to the PPNs of their SVGs for implementation. For example, in a scenario in which respective replicas of application data packets received at a given PPN are to be sent to some number of destinations (other PPNs or message consuming application components), the rules/guidelines sent to a given PPN may include a replication directive of the kind introduced above. The replication directive may, for example, include a portion of a replication graph which indicates the set of destinations to which replicas of packets of a given packet flow are to be sent, the order in which the different replicas of the same message are to be sent, and whether any of the replicas is to be buffered locally (thereby introducing some delay) before it is sent. In at least some embodiments, the instructions, rules or directives sent to PPNs from RDNs may be prepared at the RDNs in such a manner that the corresponding packet processing tasks can be performed by the PPNs very quickly and efficiently (i.e., with few or no complex computations). For at least some packet flows, the rules/directives may be prepared at an RDN the first time a packet of that flow is encountered; after the rules/directives are sent to the PPNs, the rules may be cached at the PPNs so as to avoid communicating with the RDNs for additional packets of the same flow. Of course, the RDNs may re-send rules/directives (e.g., based on re-generation of the replication graphs in various RAIs) in some cases for a given packet flow. In general, different packet flows can use different combinations of PPNs (e.g., based on flow hashing, and/or distinct replication graphs being generated for the flows) and/or different RDNs in at least some embodiments. Over time, the set of PPNs and/or RDNs of a given SVG may be modified by the CPSs, e.g., based on changing application workload or network conditions, failures of some of the nodes and/or other events.

Figure 3:
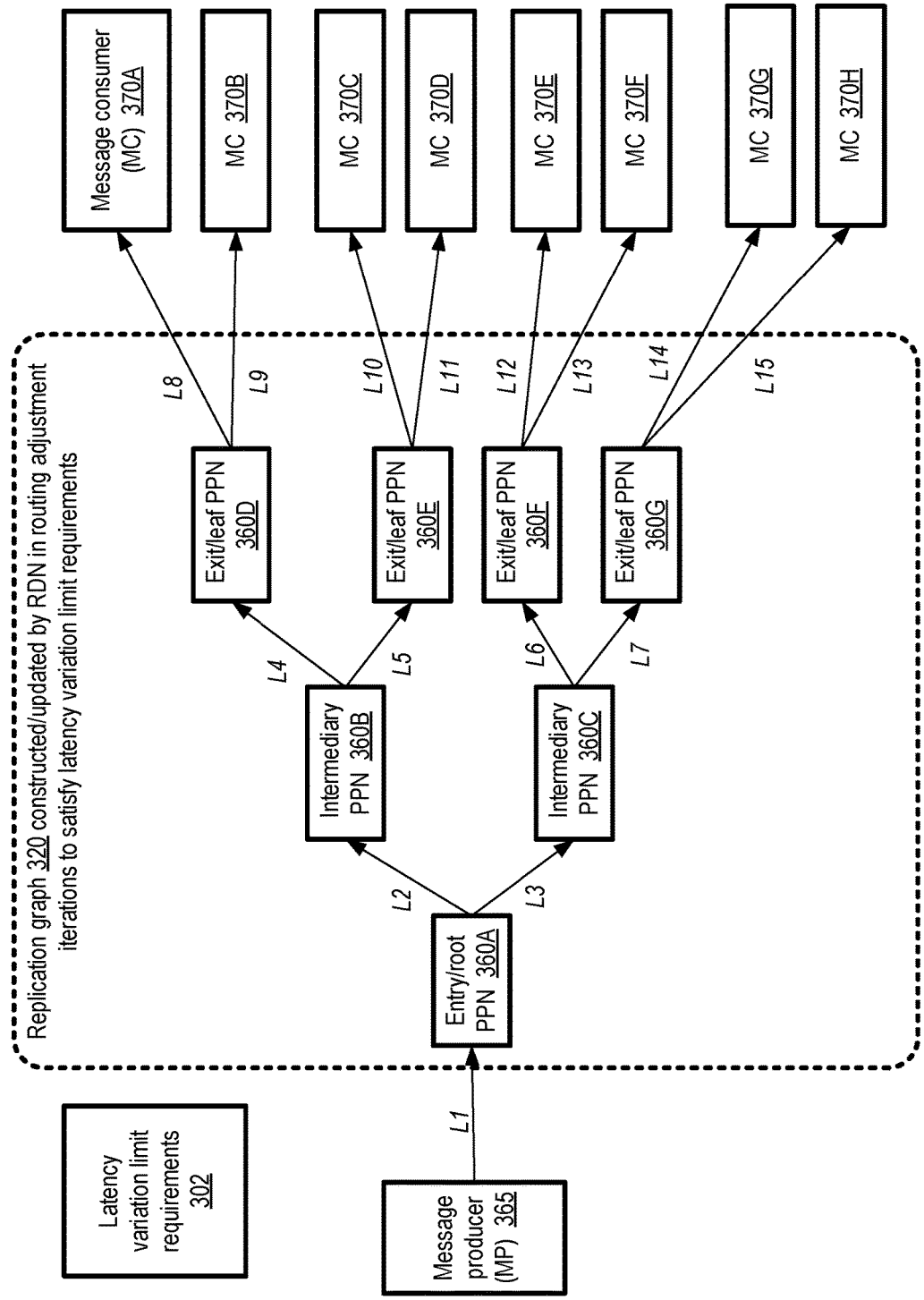
FIG. 3 illustrates an example replication graph which may be constructed by routing decisions nodes of a scalable virtual gateway to satisfy latency variation-related requirements for replication or multicast of messages received at the gateway, according to at least some embodiments.

FIG. 3 illustrates an example replication graph which may be constructed by routing decisions nodes of a scalable virtual gateway to satisfy latency variation-related requirements for replication or multicast of messages received at the gateway, according to at least some embodiments. As shown, replication graph 320 may be constructed and (if needed) updated over time by an RDN in various routing adjustment iterations (RAIs) to satisfy latency variation limit requirements 302 of a set of applications. The set of applications may include various components, including at least one message producer (MP) 365 and a set of message consumers (MCs) 370, including MC 370A, MC 370B, MC 370C, MC 370D, MC 370E, MC 370F, MC 370G and MC 370H. The latency variation limit requirements may apply to the end-to-end latencies for transmitting respective replicas of a given application data message (which is generated or produced at MP 365) to the different MCs.

The replication graph (RG) may comprise a plurality of PPNs, enabling the replication work to be distributed among multiple resources in the depicted embodiment. A solution which uses a single PPN may not scale as the rate at which messages are produced by MP 365 increases, so using multiple PPNs may be suitable. The RG may comprise a plurality of vertices, each representing a respective PPN, and a set of directed edges between the PPNs represented by the vertices. The direction of a given edge may indicate the destination to which the PPN represented at the source vertex of the edge is to send a replica of a received application data message. For example, the edge directed from PPN 360A to PPN 360B indicates that a replica of an application data message received at PPN 360A is to be sent to PPN 360B. An RG may include at least one entry/root PPN such as 360A, and one or more exit/leaf PPNs such as 360D, 360E, 360F and 360G. Replicas of application data messages received at PPN 360A may be sent to the exit/leaf PPNs via one or more layers of intermediary PPNs (i.e., PPNs that are neither entry PPNs nor exit PPNs), such as intermediary PPNs 360B and 360C.

As indicated earlier, an SVG may in general comprise one or more RDNs and one or more PPNs chosen by a CPS. The specific PPNs of that SVG that are included in an RG for a given set of one or more packet flows by an RDN, and the respective positions of the chosen PPNs within the RG (i.e., whether a given PPN is an entry, exit or intermediary PPN, and the other nodes to which it is attached) may be chosen by the RDN based at least in part on latency metrics collected by the RDN. The latency metrics collected and used to generate the RG may include the packet/message transmission latencies among the various PPNs of the SVG, the transmission latencies between the MP and various PPNs, and/or the transmission latencies between various PPNs and the MCs. In at least some embodiments, special measurement-oriented packets (separate from the application data message packets for which the latency variation limit requirements 302 are to be satisfied) may be exchanged periodically (e.g., at least once during a given RAI) among the PPNs of the SVG, between the MP and various PPNs of the SVG, and between the PPNs and the MCs. The nodeto-node latencies measured for such measurement-oriented packets are shown in FIG. 3 using the labels L1, L2, L3, L4, L5, L6, L7, L8, L9, L10, L11, L12, L13, L14 and L15. Note that the SVG may include more PPNs than the PPNs represented in the RG; latencies for packets transmitted among those nodes may also be captured and analyzed by the RDN. Ignoring all other factors (such as the replication order discussed below in) which can impact the overall end-to-end latency for message replication, the RDN may construct the RG shown in FIG. 3 based at least in part on comparing the sum of the metrics of node-to-node transmission latencies encountered during transmission of the replicas to the different MCs. For example, the sum of the transmission latencies for messages reaching MC 370A is (L1+L2+L4+L8), the sum of the transmission latencies for messages reaching MC 370F is (L1+L3+L6+L13), and so on. The RDN may position the various PPNs in the RG in such a way that these sums are as close to one another as possible in at least some implementations.

In the simple example shown in FIG. 3, there is only one layer of intermediary PPN, and the lengths (in terms of the count of directed edges of the RG) of the paths between the MP and each of the MCs is the same. In general, one or both of these conditions may not apply—e.g., there may be multiple intermediary layers, and the lengths of some paths may differ from others. The depicted RG may also be referred to as a latency-balanced replication tree, or a balanced tree. In general, while the RG of FIG. 3 shows individual ones of the PPNs sending exactly two replicas (a fan-out of two), the number of replicas sent from a given PPN may differ in various embodiments—e.g., the fan-out from a given PPN may not necessarily be two, and the fan-out from a given PPN may differ from the fan-out of another PPN.

As the RDN responsible for the RG receives additional latency metrics and/or other data (such as information about the health states of the PPNs), it may update the RG based on analysis of the received information, and propagate respective portions or all of the updated RG to the PPNs so that they can transmit replicas of received application data messages accordingly. Note that at least in some embodiments, not all the PPNs of an SCG may be equivalent in terms of their computing capacities and/or networking capacities, and the number of physical network hops between a given PPN and a given MC or MP may differ from the number of physical network hops between another PPN and the same MC or MP. Such hop count data may also be obtained at the RDN and used to decide which PPNs are to be deployed as exit and/or entry PPNs in such embodiments.

Figure 4:
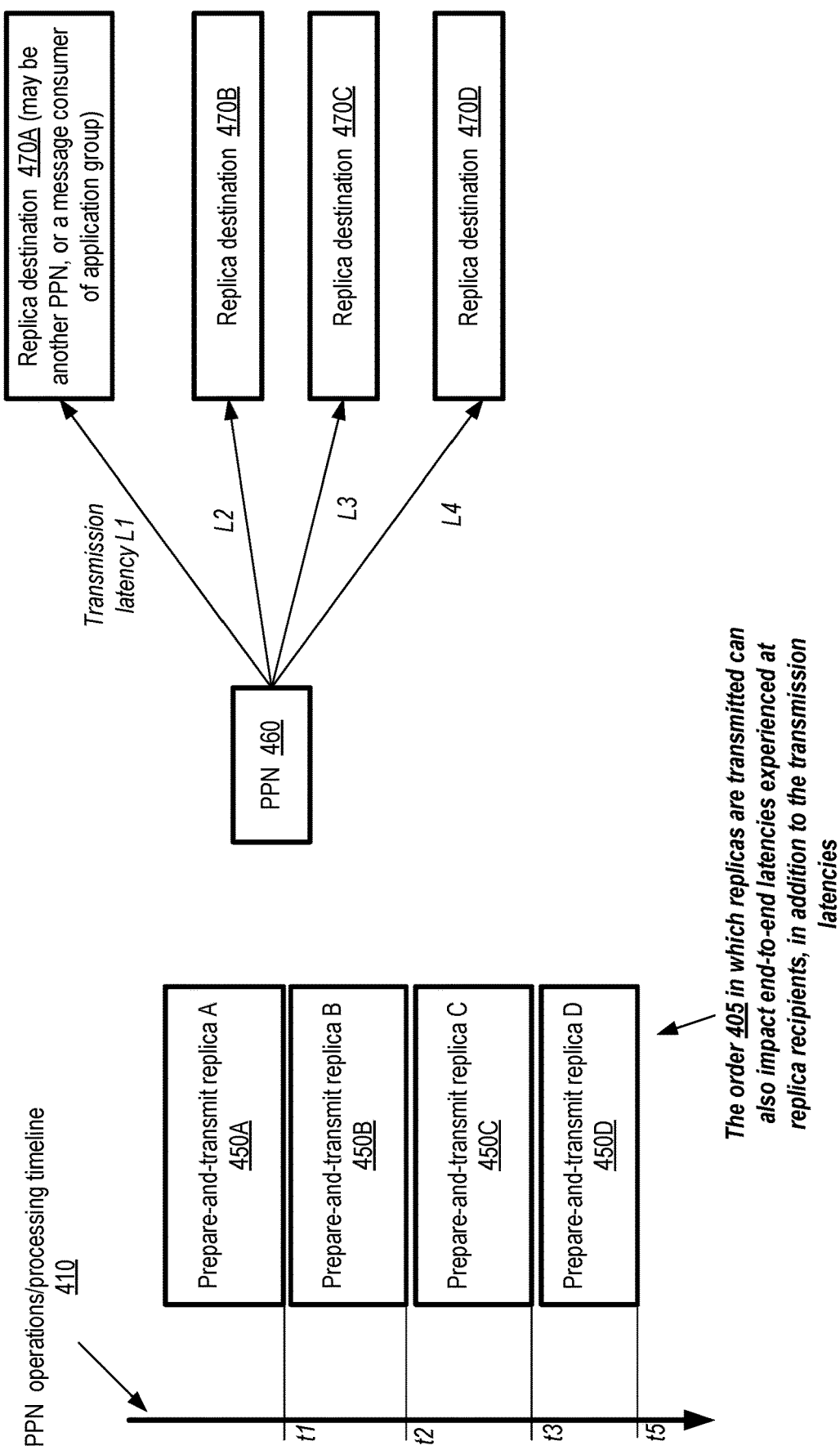
FIG. 4 illustrates an example scenario in which a routing decisions node may take transmission latencies as well as the elapsed time of replication-related processing operations at packet processing nodes of a gateway into account when providing replication directives to the packet processing nodes, according to at least some embodiments.

FIG. 4 illustrates an example scenario in which a routing decisions node may take transmission latencies as well as the elapsed time of replication-related processing operations at packet processing nodes of a gateway into account when providing replication directives to the packet processing nodes, according to at least some embodiments. PPN operations/processing timeline 410 shows the timing of a sequence of events at a PPN 460. The PPN 460, which is configured as one of the nodes of an SVG and is represented as a vertex in a replication graph (RG) of the kind shown in FIG. 3, is to transmit respective replicas of received application data messages (which may themselves be replicas sent from other PPNs in some cases) to four replica destinations 470A, 470B, 470C and 470D. Depending on the position of the PPN 460 in the RG, a given replica destination 470 may be another PPN, or a message consumer component of an application group.

Metrics of the message transmission latency between PPN 460 and the various destinations may be collected and/or analyzed by an RDN as discussed above. For example, in a given RAI conducted by an RDN, L1 may indicate the measure transmission latency between PPN 460 and destination 470A, L2 may indicate the measure transmission latency between PPN 460 and destination 470B, L3 may indicate the measure transmission latency between PPN 460 and destination 470C, and L3 may indicate the measure transmission latency between PPN 460 and destination 470D.

In the embodiment depicted in FIG. 4, PPN 460 may transmit replicas in sequence to the different destinations (as opposed to doing so in parallel). As a result, the total time taken between the receipt of an application data message at PPN 460, and the time at which PPN 460 has completed sending (e.g., placing the last byte of the message on a wire) a replica of that message to the first of the four destinations, may differ from the corresponding time for the second, third or fourth destinations. Along timeline 410, for example, the first replica (replica A) of the four may be sent by time t1, after operations prepare-and-transmit replica A 450A are completed. The second replica (replica B) may be sent by time t2, after operations prepare-and-transmit replica B 450B are also completed. The third replica (replica C) may be sent by time t3, after operations prepare-and-transmit replica C 450C are also completed, and the fourth replica (replica D) may be sent by time t4, after operations prepare-and-transmit replica D 450D are also completed. The differences in these times (e.g., (t2−t1), (t3−t1), etc.) may also contribute to the overall end-to-end latencies of the replication. In effect, the order 405 in which the replicas are sent can also impact the overall latency, and not just the transmission latencies L1, L2, L3 and L4. In at least some embodiments, when preparing a replication directive, an RDN may obtain or estimate the expected elapsed time (e.g., t2−t1) for operations performed at various PPNs to generate and transmit a replica of an application data message. The RDN may then include, in a replication directive to a given PPN, a proposed order in which the different replicas are to be sent. The order may be determined by the RDN based at least in part on the estimated elapsed time, the target latency metrics, and/or the transmission latency metrics (such as L1, L2, L3 etc.). For example if L1 is less than L2, in some cases the RDN may command the PPN 460 to send a replica to L2 before sending a replica to L1, so that the sum of the elapsed times for local processing and the transmission latencies can be made closer for the two destinations 470A and 470B. In embodiments in which a given PPN can prepare and send the replicas in parallel, the RDN may not necessarily include ordering information in the replication directives sent to that PPN.

Figure 5:
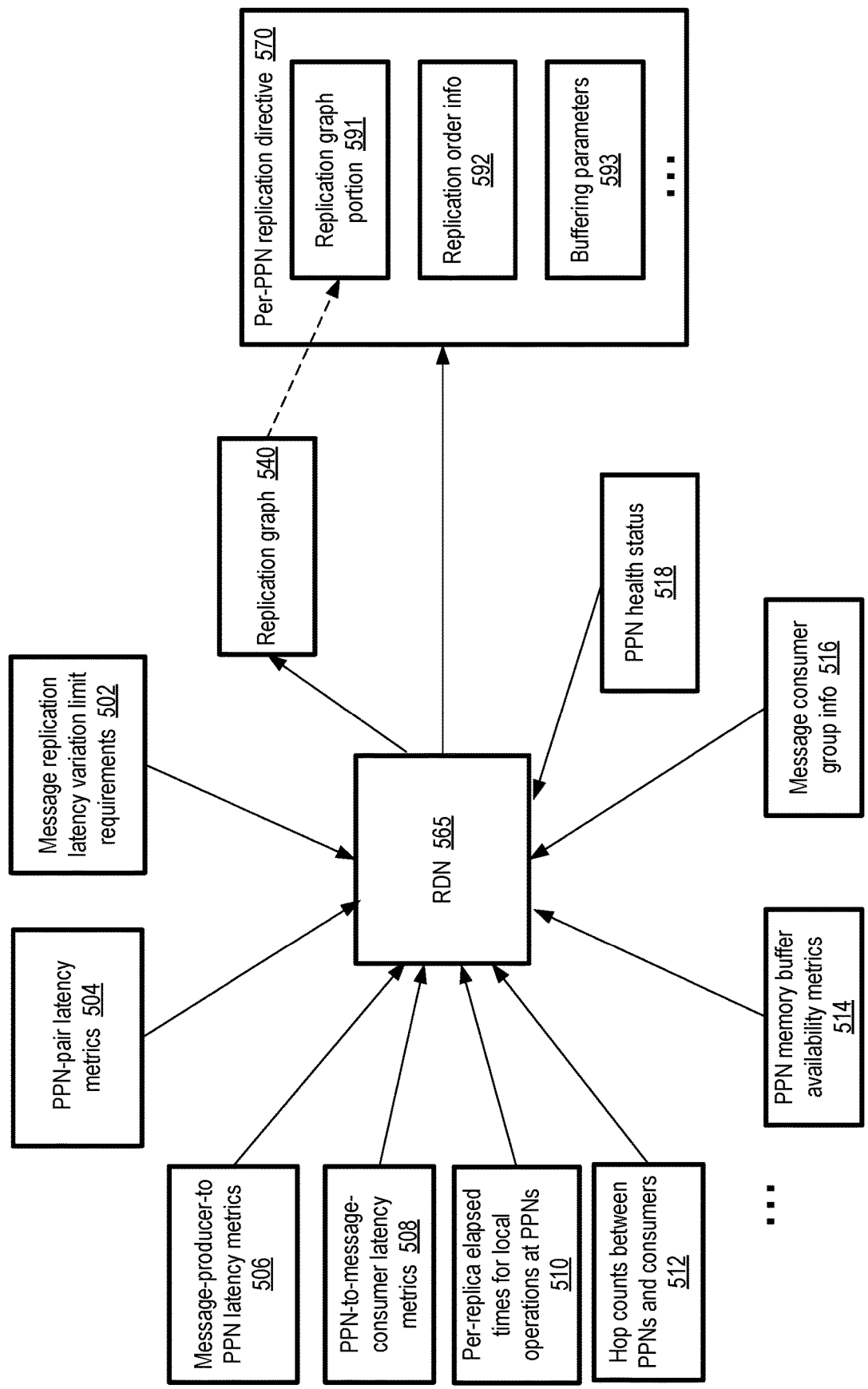
FIG. 5 illustrates examples of factors which may be taken into account by a routing decisions node to prepare a replication directive for a packet processing node, according to at least some embodiments.

FIG. 5 illustrates examples of factors which may be taken into account by a routing decisions node to prepare a replication directive for a packet processing node, according to at least some embodiments. In the depicted embodiment, an RDN 565 may prepare and send respective per-PPN replication directives 570 to one or more PPNs of an SVG during a given RAI. The replication directive may include, among other elements, one or more of: a replication graph portion 591 (a relevant subset of a replication graph 540 prepared by the RDN, or the entire graph), replication order information 592 (indicating the sequence in which the PPN should send respective replicas of a given application data message to multiple recipients) and or buffering parameters 593 (indicating whether a given replica should be buffered locally at the PPN before being sent to a destination, so as to add a delay which may help satisfy latency variation limit requirements). The contents of the replication directive sent to one PPN may differ from the contents of the replication directive sent to another PPN in the same RAI in some cases. Furthermore, the contents of a replication directive sent to one PPN in one RAI may differ from the contents of another replication directive sent to the same PPN in another RAI. IN some embodiments, a replication directive need not be sent to at least some PPNs during a given RAI, e.g., if the analysis performed by the RDN indicates that no update is required.

The RDN 565 may take numerous factors into account when preparing a replication graph and the replication directives it sends to the PPNs. In the depicted embodiment, such factors may include the message replication latency variation limit requirements 502 of the application group whose messages are to be replicated, as well as several kinds of latency or time-related metrics including PPN-pair latency metrics 504, message-producer-to-PPN latency metrics 506, PPN-to-message-consumer latency metrics 508, and/or per-replica local operations elapsed times 510. In at least some embodiments, special-purpose latency measurement messages may be sent periodically between various PPNs, between PPNs and the message producers of the application group, and between PPNs and the message consumers of the application group, and recently-collected values of such latency metrics (e.g., the metrics collected over the last N seconds, where N is a parameter chosen by the VCS control plane or the customers on whose behalf the application group is being run) may be analyzed and used by the RDN to construct a replication graph 540 of the kind described above. The per-replica elapsed times for local operations performed at PPNs (such as the operations discussed in the context of FIG. 4) may be measured (e.g., also periodically) and obtained by the RDN, and used to generate replication order information 592 in some embodiments. In at least some implementations, the hop counts between PPNs and consumers 512 may differ—e.g., from some PPNs, a single physical network hop may be required to reach the hosts at which a message consumer runs, while from other PPNs the number of hops may be greater. Such hop counts information may be used by the RDN to generate the replication graph in at least some embodiments (e.g., to select exit/leaf PPNs of the graph).

The RDN 565 may also obtain PPN memory buffer availability metrics 514 in some embodiments, indicating the total amount of memory available at individual ones of the PPNs for the purpose of storing replicas to introduce delays before the replicas are transmitted, the fraction of that total amount which has been available over a recent time interval, and so on. Such data may be analyzed by the RDN to generate the buffering parameters for different replication directives.

The number of message consumers of the application group may change over time in some cases, and/or the network addresses of some of the consumers may change. Message consumer group information 516, indicating the number and addresses of the consumers, may also be obtained at the RDN to prepare and/or update the replication graph. In at least some embodiments, one or more of the PPNs of the SVG may become overloaded and/or fail. The RDN may obtain PPN health status 518 periodically (indicating whether each of the PPNs is responsive) and use this in constructing the replication graph. Some of the data shown as being obtained and analyzed at the RDN may be collected at different rates than others in the depicted embodiment, and some of the data may only be collected once instead of repeatedly. For example, hop counts information and/or per-replica elapsed times for local operations may be gathered/verified less frequently than latency metrics. In some embodiments, combinations of factors other than those shown in FIG. 5 may be used by an RDN to generate the replication directives, or some of the factors shown may not be taken into account.

Figure 6:
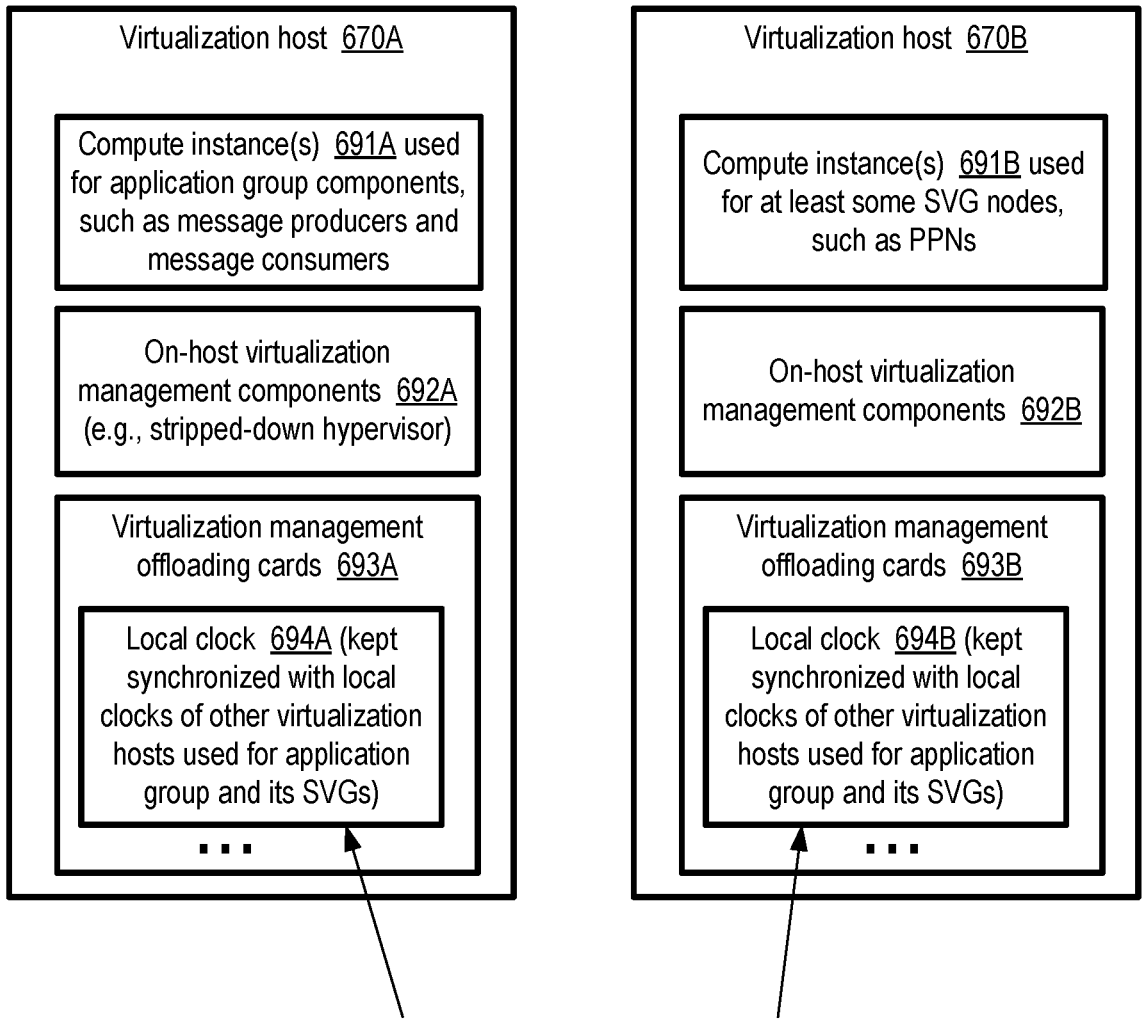
FIG. 6 illustrates an example use of synchronized local clocks at cloud provider network hosts for accurate latency measurements for latency-sensitive application groups, according to at least some embodiments.

FIG. 6 illustrates an example use of synchronized local clocks at cloud provider network hosts for accurate latency measurements for latency-sensitive application groups, according to at least some embodiments. In the depicted scenario, compute instances 691A at some number of virtualization hosts 670A may be used to run various components or constituent programs of the application group whose messages are to be replicated, while compute instances 691B at another set of virtualization hosts 670B may be used to run SVN nodes including PPNs and/or RDNs.

Individual ones of the compute instances may comprise respective virtual machines in the depicted embodiment. At least some of the virtualization hosts 670 may comprise two types of virtualization management components: on-host virtualization management components such as 692A and 692B, which comprise software running on the primary processors (such as CPUs) of the hosts, as well as virtualization management components run using processors on virtualization management offloading cards 693A and 693B. The offloading cards may be used to reduce the virtualization management related overhead on the primary processors, thereby enabling more of the processing capability of the primary processors to be used for application programs, packet processing tasks and the like. In some embodiments, virtualization management tasks related to booting/startup of compute instances, memory management of compute instances, and/or networking virtualization operations may be performed at the offloading cards, while the on-host virtualization management components may include stripped-down versions of hypervisors.

In various embodiments, fine-grained accurate measurement of latencies (e.g., at the millisecond or microsecond level) may be required to satisfy the performance requirements of various application groups. If the local clocks at the hosts used for the components of the system drift substantially out of synchronization, it may become difficult to obtain sufficiently accurate latency measurements for the applications. In the embodiment depicted in FIG. 6, local clocks 694A and 694B of at least some of the virtualization hosts of the VCS may be kept in tight synchronization, e.g., with the help of a time synchronization service of the provider network being used. A dedicated network infrastructure may be employed by such a time synchronization service for delivering highly accurate timing signals sourced from GNSS (Global Navigation Satellite Systems) receivers to various virtualization hosts.

In at least one embodiment, the synchronized local clocks 694 may be implemented or maintained within virtualization management offloading cards 693 of the virtualization hosts, and the virtualization management components may in turn provide accurate clocks to the compute instances 691. The local clocks of the different virtualization hosts used for the application group components may be kept in synchrony with the local clocks used for the SVG nodes in the depicted embodiment. Note that in some embodiments, some of the virtualization hosts of a VCS may offer different levels of local clock synchronization than others. In such cases, the VCS control plane servers may select hosts with a desired level of local clock synchronization when deciding the placement of the compute instances used for latency-sensitive application groups and/or SVGs used for such application groups. In at least some embodiments, customers/clients of the VCS may specify clock synchronization requirements when requesting compute instances for their distributed application components, and hosts which can satisfy the clock synchronization needs may be assigned by the VCS control plane. In the embodiment shown in FIG. 6, timestamps 605 generated using the synchronized local clocks 694 may be used for capturing latency measurements (e.g., including metrics collected by RDNs and used to prepare replication directives, as well as metrics of application data message latencies which may be provided to the customers/clients upon request). Such timestamps may also be used to collect the elapsed times for local per-replica processing operations at the PPNs in some embodiments.

Figure 7:
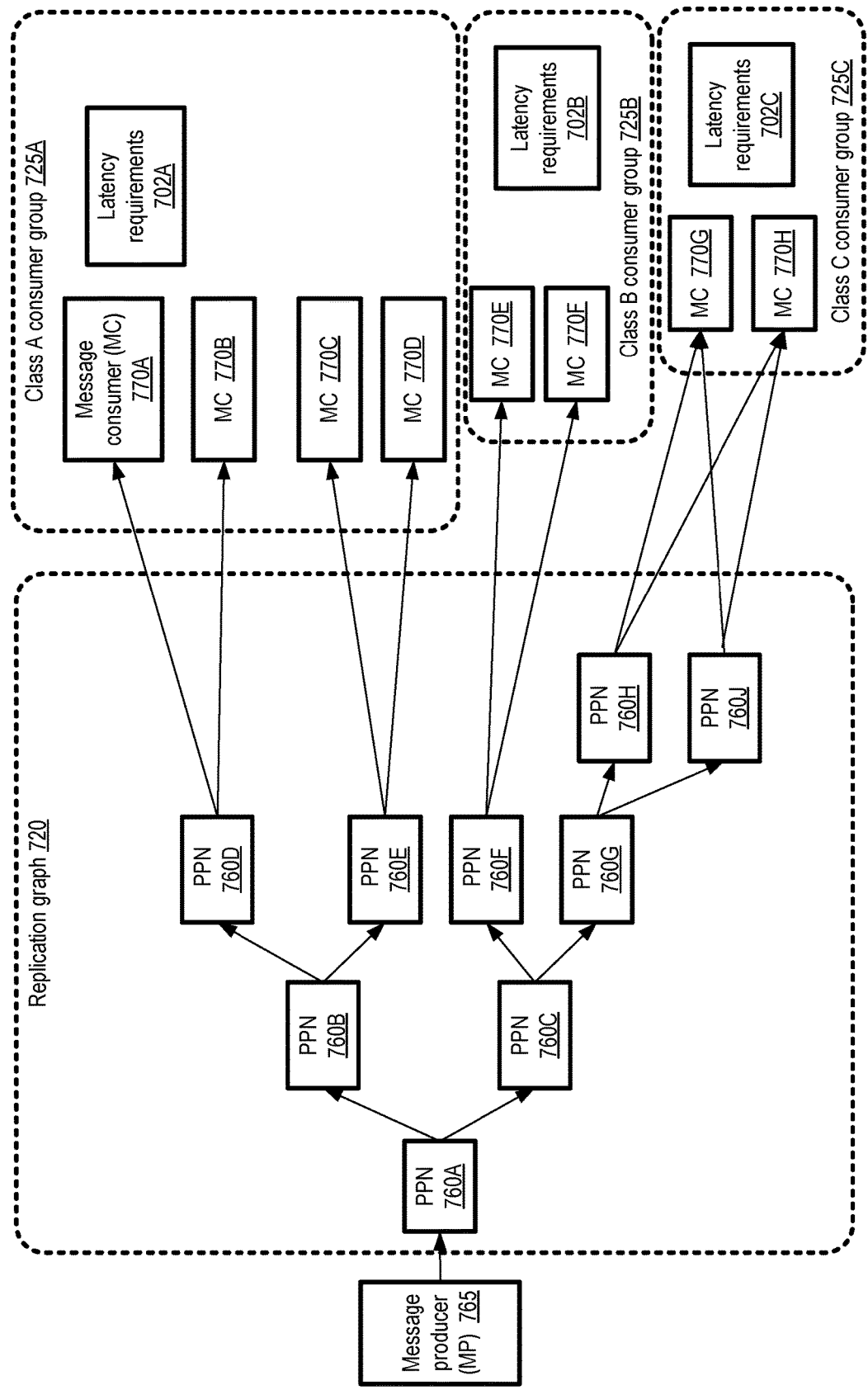
FIG. 7 illustrates an example scenario in which a scalable virtual gateway may be employed to satisfy differing latency requirements for respective groups of message replica consumers, according to at least some embodiments.

FIG. 7 illustrates an example scenario in which a scalable virtual gateway may be employed to satisfy differing latency requirements for respective groups of message replica consumers, according to at least some embodiments. In the depicted embodiment, the latency requirements of some message consumers of an application group may differ from the latency requirements of other message consumers. For example, latency requirements 702A may apply to Class A consumer group 725A comprising message consumer (MC) 770A, MC 770B, MC 770C and MC 770D. A different set of latency requirements 702B may apply to Class B consumer group 725B comprising MC 770E and MC 770F, while a third set of latency requirements 702C may apply to Class C consumer group 725C comprising MC 770F and 770G. The latency requirements of the respective consumer groups may differ from one another in any of several ways—for example, the latency variation limit requirements may differ from one class of consumer group to another, the absolute latency requirements may differ from one class to another, or both the variation limit and the absolute latency requirements may differ. The owners of the application group may use programmatic interfaces of the VCS to indicate, to the VCS control plane servers, the classes to which different MCs belong and the respective latency requirements of each class or consumer group. In the scenario shown in FIG. 7, all the MCs may need to obtain respective replicas of each application data message from a message producer (MP) 765, but with different performance requirements for the end-to-end transfer.

Based on the membership and requirements of the different consumer groups, a replication graph 720 may be constructed by an RDN of an SVG of the kind described above. The replication graph comprises PPN 760A as a root or entry node, PPNs 760D, 760E, 760F, 760H and 760J as exit/leaf nodes, and PPNs 760B, 760C, and 760G as intermediary nodes. The number of PPNs encountered on one replication pathway of the graph may differ from the number encountered along other replication pathways in graph 720—e.g., the replication paths to MCs 770G and/or 770D may include one or more PPN than the replication pathways to the other MCs.

In at least some embodiments, an SVG may also support additional features, such as transmission of multiple replicas of the same application data message to a given MC. For example, in the replication graph 720, PPN 760H and 760J may both send a respective replica of an application data message to MC 770G, and both may also send a respective replica of an application data message to MC 770H. Such an approach may be useful, for example, if the operations performed at the consumer groups upon receiving a given application data message are idempotent, i.e., receiving a replica of the same message twice is acceptable. A VCS customer may in some cases request that multiple replicas of a given messages be sent to a given consumer via different pathways (as shown in the case of MCs 770G and 770H) with the objective being that the receiving MC would respond to the first-received of the multiple replicas (the one delivered before any of the other replicas of the same message), and ignore the later-received replicas.

Figure 8:
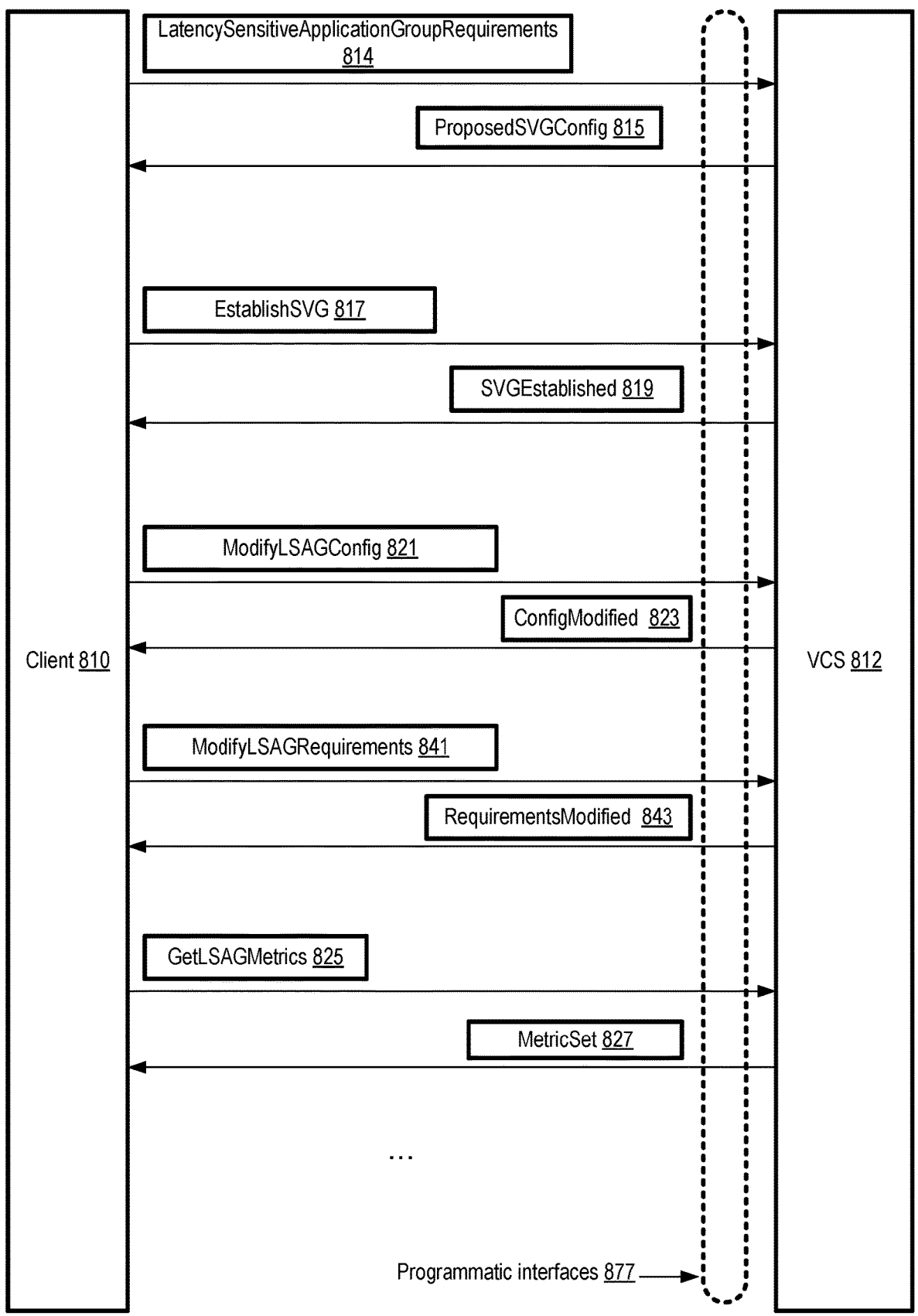
FIG. 8 illustrates example programmatic interactions, pertaining to the management of message replication latencies, between customers and a network-accessible service of a cloud computing environment, according to at least some embodiments.

FIG. 8 illustrates example programmatic interactions, pertaining to the management of message replication latencies, between customers and a network-accessible service of a cloud computing environment, according to at least some embodiments. A VCS 812, similar in features and functionality to VCS 105 of FIG. 1, may implement a set of programmatic interfaces 877 in the depicted embodiment, such as one or more web-based consoles, command-line tools, graphical user interfaces and/or APIs. Clients 810 (e.g., owners/operators of various applications or application groups) may utilize the programmatic interfaces to submit requests and information pertaining to the latency-sensitive replication of application data messages, and receive corresponding responses.

A client 810 may indicate the overall layout or architecture (e.g., in terms of the number and types of different compute instances that may be used for implementing message producers, business logic, message consumers etc.) of a latency-sensitive application group (LSAG) to the VCS control plane via programmatic interfaces 877 in various embodiments. In at least some embodiments, the performance requirements of the application group, including latency-related requirements, may be provided by the client via one or more LatenySentiveApplicationGroupRequirements messages 814 (which may also include the proposed layout of the application group). The VCS control plane servers may analyze the requirements and the layout, and generate a proposed configuration which includes an SVG of the kind introduced above. A ProposedSVGConfig message 815 may be sent to the client, providing an overview of the configuration. In at least some embodiments, the VCS control plane may recommend the use of compute instances that run on virtualization hosts with synchronized local clocks of the kind discussed above for the components of the LSAG in the proposed configuration.

If the client approves the configuration, the client may send an EstablishSVG request 817 in the depicted embodiment. The VCS may then configure an SVG comprising some initial number of RDNs and PPNs for the application group (e.g., also running on hosts with synchronized local clocks), and send an SVGEstablished response message 819 to the client. An EstablishSVG request may be sent by the client without first receiving a ProposedSVGConfig message in some cases. In some embodiments, instead of sending separate messages indicating the requirements and layout of the LSAG and then requesting an SVG, a client may send a single message which (a) provides requirements of an LSAG and (b) requests the VCS to set up an SVG which can be used for the LSAG.

A ModifyLSAGConfig request 821 may be sent by the client to the VCS in some embodiments, indicating a change in the layout and/or performance requirements of an LSAG. Such a message may be needed, for example, if and when message consumers are to be added or removed from the configuration, and/or if and when message producers are to be added or removed. In response, configuration changes that may be needed to adapt to the changes (e.g., adding PPNs or RDNs, causing new replication graphs to be generated and propagated to PPNs etc.) may be initiated by the VCS control plane, and a ConfigModified message 823 may be sent to the client in some embodiments.

In some embodiments, a client 810 may wish to change the performance requirements of an LSAG, without modifying the layout of the LSAG. In such a scenario, the client may submit a ModifyLSAGRequirements request 841 indicating the new requirements (e.g., requirements for stricter limits on message replication latency). The VCS control plane may analyze the updated requirements, determine whether any configuration changes may need to be made, and initiate any needed configuration changes. A RequirementsModified message 843 may be sent to the client in some embodiments.

Clients 810 may request various kinds of metrics pertaining to their LSAGs in different embodiments, e.g., via one or more GetLSAGMetrics requests 825. The metrics may include, for example, the measured latencies for replicating application data messages among a specified set of message consumers, the total amount of data that was transmitted for such replications, counts of packet drops, statistics such as variance or standard deviations of the latency, and so on. The requested metrics may be provided to the client via one or more MetricSet messages 827 in the depicted embodiment. In at least some embodiments, programmatic interactions pertaining to message replication-related techniques, other than those shown in FIG. 8, may be supported by a VCS.

FIG. 9 is a flow diagram illustrating aspects of operations, pertaining to the management of message replication latencies, which may be performed at a cloud computing environment, according to at least some embodiments. As shown in element 901, an indication of network traffic requirements of an LSAG may be obtained or received e.g., via one or more programmatic interfaces or requests, at a CPS of a VCS of the kind discussed above. The requirements may include a set of latency-related requirements such as targeted latency variation limits for delivering respective replicas of application data messages from a message producer (MP) of the LSAG to members of a message consumer group (MCG) of the LSAG. The MCG members may be referred to as a multicast group, and the replication of the messages may be the logical equivalent of multicasting.

Based at least partly on the requirements of the LSAG, the CPS may configure a multi-node SVG SVG1 for handling at least the message replication portion of the LSAG traffic in the depicted embodiment (element 904). Note that in some embodiments, SVG1 may also be used for other kinds of traffic, such as forwarding application requests generated from some components of the LSAG to other components. SVG1 may include a set of RDNs and a set of PPNs. The RDNs may be configured to provide guidelines/rules/directives to the PPNs regarding the specific packet processing tasks (such as replication of received messages to a set of destinations) that the PPNs are to perform, and the PPNs may be responsible for implementing those guidelines/rules/directives efficiently in various embodiments.

One or more of the RDNs of SVG1 may obtain, from the CPS, an indication of (a) an initial configuration of the LSAG (e.g., an initial count of message consumers (MCs), network addresses of the MCs and at least one MP, etc.), and (b) the traffic requirements of the LSAG (element 907) in the depicted embodiment.

A given RDN may then commence a sequence of routing adjustment iterations (RAIs) (element 910). RAIs may in general be initiated based on any of several triggering conditions in different embodiments, such as (except in the case of the very first RAI for a given application data packet flow) determining that N seconds have elapsed since the previous RAI was executed (where N is a tunable parameter chosen by the VCS control plane or by customers on whose behalf SVG1 is set up), obtaining an indication that the LSAG configuration has changed due to the addition/removal of MCs or MPs, determining that one or more PPNs have failed, etc.

In a given RAI, the RDN may analyze a variety of factors to generate guidance for various PPNs of SVG1. The factors (similar to the factors indicated in FIG. 5) may include the latency-related requirements of the LSAG and recently-collected latency metrics for message transfers among various PPNs, the PPNs and the MP, and the PPNs and the MCs. Based on analysis of the factors, the RDN may construct, update or re-verify a replication graph RG in various embodiments. The vertices of RG may represent respective PPNs, and directed edges may indicate the destinations (e.g., other PPNs, or MCs of the MCG) to which a given edge at the origin of the edge is to send replicas of received application data messages. At least one PPN of RG may be configured as an entry point for messages from an MP, while one or more of the PPNs may be designated as exit points for delivering replicas to the MCs. RG may be constructed such that the estimated end-to-end latencies for messages replicated using pathways indicated by RG's directed edges satisfy the latency-related requirements of the LSAG. The RDN may transmit, if needed, an updated or newly-generated replication directive to individual ones of the PPNs in the RAI. The replication directive may include at least a portion of the RG. The RDN may in some cases include a buffering parameter/requirement for replicas that are to be directed to one or more destinations by the PPN. In at least one embodiment, a replication directive may indicate an order in which the PPN should send respective replicas of a given received application data message to individual ones of multiple destinations.

After a given PPN receives the latest replication directive, it (The PPN) may perform the requested message replication-related actions indicated in the directive (element 913). For example, upon receiving an application data message, the PPN may prepare and send respective replicas of the message to several destinations indicated in the portion of the RG included in the directive, in an order indicated in the directive, while delaying some of the replicas according to the buffering requirements indicated in the directive. The PPN may continue to follow the guidance provided in the directive as it receives various application data messages, until a new directive is received. In its next RAI, the RDN may again analyze the latest-available latency metrics and/or other factors, and send an updated directive to the PPNs.

Figure 10:
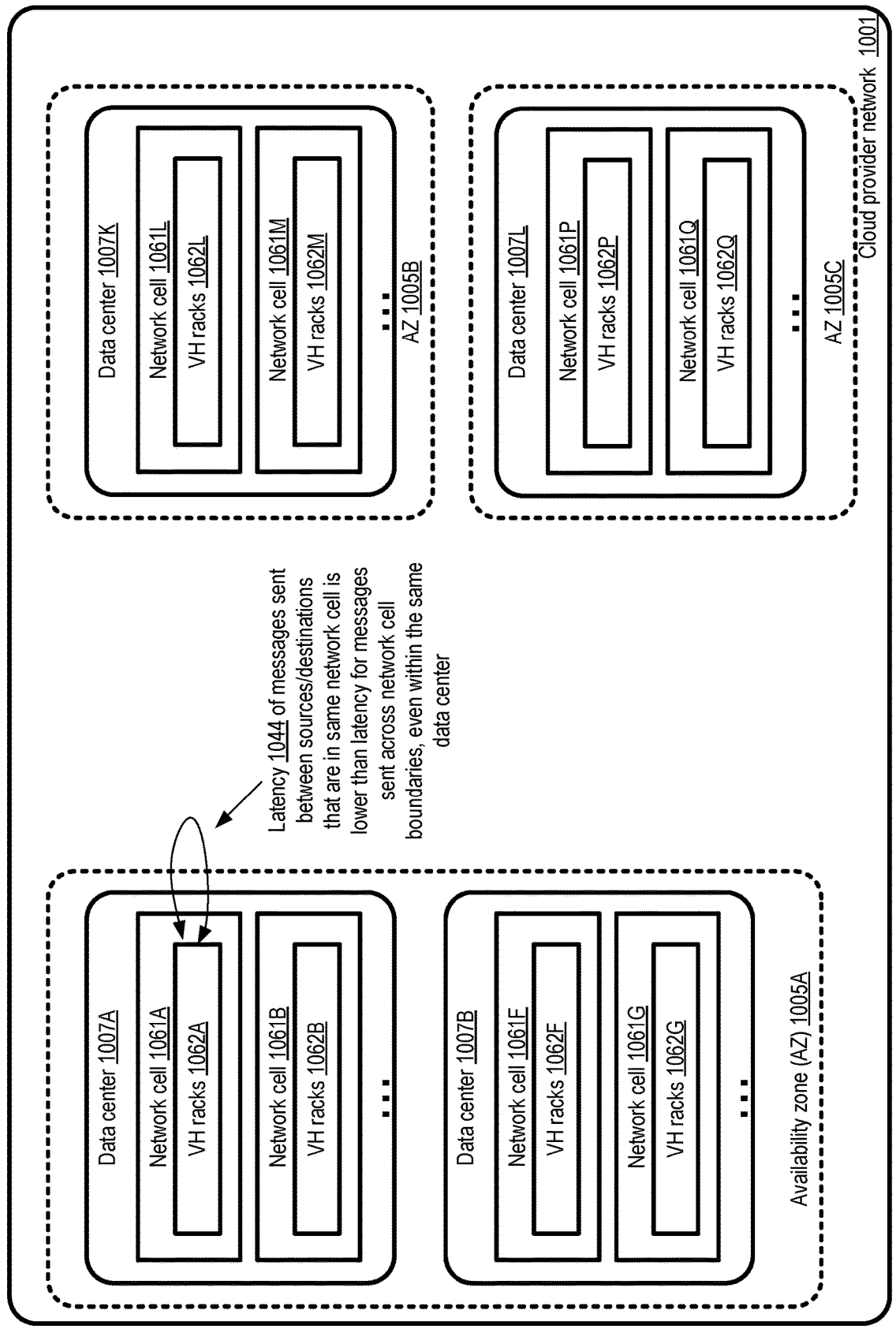
FIG. 10 illustrates an example configuration of a cloud provider network whose data centers are organized as collections of network cells comprising virtualization hosts, according to at least some embodiments.

FIG. 10 illustrates an example configuration of a cloud provider network whose data centers are organized as collections of network cells comprising virtualization hosts, according to at least some embodiments. Cloud provider network 1001 may comprise a set of availability zones (AZs), such as AZ 1005A, AZ 1005B and AZ 1005C in the depicted example configuration. As mentioned earlier, an AZ is an isolated failure domain which can include one or more data centers. A given region of a cloud computing environment can include several AZs in some cases, set up in locations sufficiently remote from one another such that an environmental event such as a hurricane or flood is unlikely to take multiple AZs offline.

AZ 1005A comprises data centers 1007A and 1007B, AZ 1005B comprises data center 1007K, and AZ 1005C comprises data center 1007L. A given data center may include a collection of network cells, each network cell in turn comprising a set of networking infrastructure (e.g., including various kinds of switches and other networking intermediary devices, cables and the like) and collection of virtualization host racks that are positioned close together in a portion of the data center. With each rack, some number of virtualization hosts (VH) may be set up and used for running compute instances or other software components of the cloud provider network. Data center 1007A includes network cell 1061A with VH racks 1062A and network cell 1061B with VH racks 1062B. Data center 1007B includes network cell 1061F with VH racks 1062F and network cell 1061G with VH racks 1062G. Data center 1007K includes network cell 1061L with VH racks 1062L and network cell 1061M with VH racks 1062M, while data center 1007L includes network cell 1061P with VH racks 1062P and network cell 1061Q with VH racks 1062Q. Note that in at least some embodiments, some network cells may differ from others in the kind of networking infrastructure that is available, and some VH racks may hold different kinds of VHs than other VH racks. In some cases, a given VH rack may include VHs that differ from one another in computing capacity, memory, storage and/or networking capabilities. In some cases, as discussed below in further detail, some data centers may comprise a hierarchy of several kinds of network cells.

In general, the latency 1044 of messages between sources and destinations that are within a single network cell may be lower than latency for messages sent across network cell boundaries, even within the same data center in the depicted embodiment. By default, in at least some embodiments, the provider network may place client-requested computing resources such as compute instances at VHs selected by control plane servers of a VCS. However, for clients whose applications or application groups are highly sensitive to the latency of message deliveries (such as the kinds of LSAGs discussed earlier), in some embodiments the provider network may provide programmatic interfaces that can be used to influence the placement of compute instances used for the applications. Clients may for example define placement groups with associated placement policies that indicate latency requirements of compute instances, and request that particular compute instances be set up within those placement groups. In at least some embodiments, the VCS control plane may use VHs within a given network cell or a small set of nearby network cells for running compute instances of the placement groups.

Figure 11:
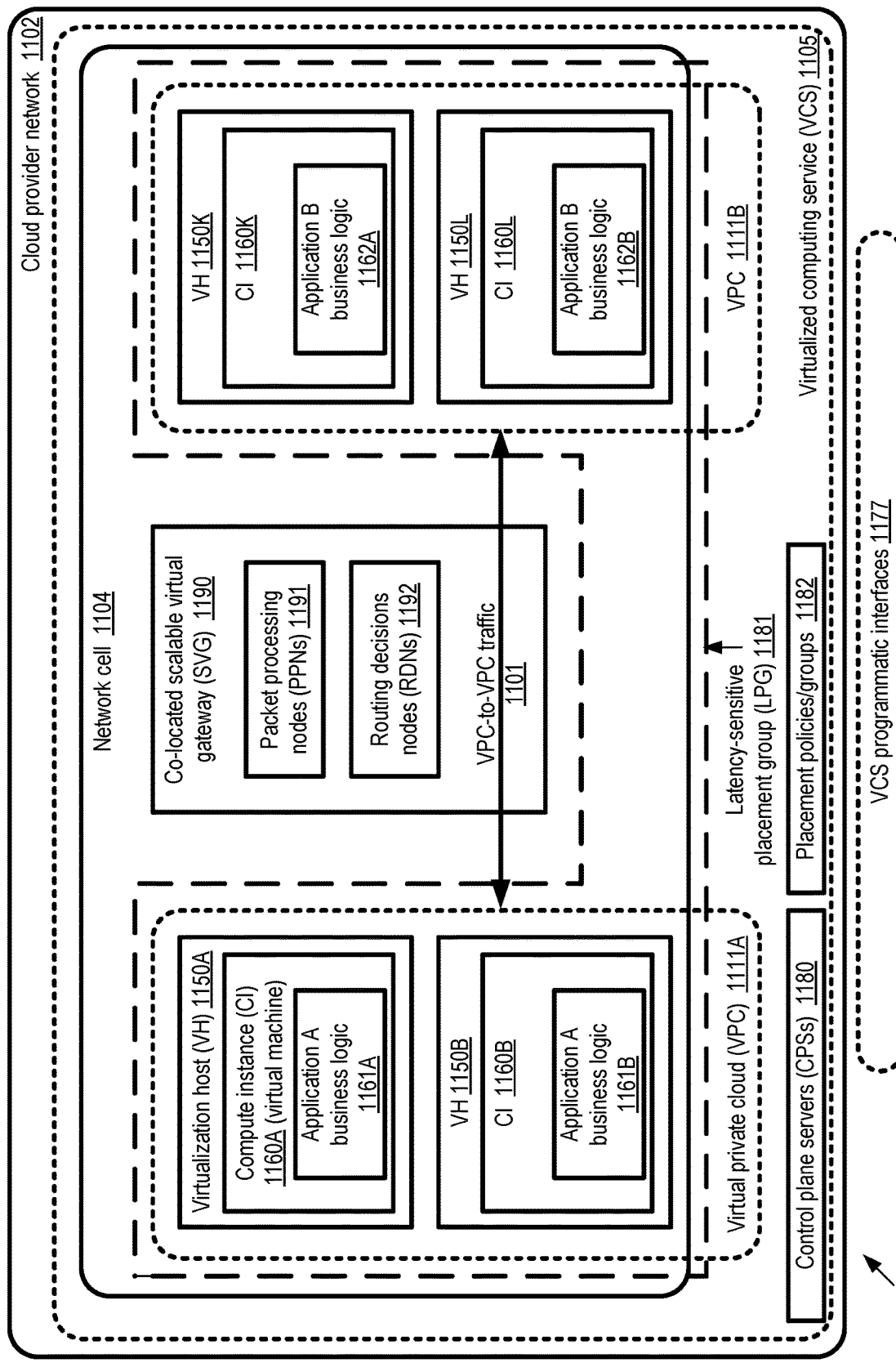
FIG. 11 illustrates an example system environment in which resources used for nodes of scalable virtual gateways may be selected based on placement policies indicated by cloud provider network clients for virtual machines whose traffic is to be processed using the gateways, according to at least some embodiments.

FIG. 11 illustrates an example system environment in which resources used for nodes of scalable virtual gateways may be selected based on placement policies indicated by cloud provider network clients for virtual machines whose traffic is to be processed using the gateways, according to at least some embodiments. As shown, system 1100 comprises resources and artifacts of a VCS 1105 of a cloud provider network 1102. Cloud provider network 1102 may offer at least a subset of the functionality described earlier with respect to cloud provider network 101 of FIG. 1, including functionality related to the creation and use of replication graphs for messages of LSAGs. VCS 1105 may include a set of control plane servers (CPSs) 1180, and a repository of placement groups/policies 1182 specified via programmatic interfaces 1177 by clients for their compute instances or virtual machines.

At the VCS 1105, respective isolated virtual networks (IVNs) referred to as virtual private clouds (VPCs) may be established on behalf of clients. A VPC may comprise a collection of networked resources (including, for example, compute instances) allocated to a given client, which are logically isolated from (and by default, inaccessible from) resources allocated for other clients in other isolated virtual networks. The client on whose behalf a VPC is established may be granted substantial flexibility regarding network configuration for the resources of the VPC—e.g., private IP addresses for application compute instances may be selected by the client without having to consider the possibility that other resources within other VPCs may have been assigned the same IP addresses, subnets of the client's choice may be established within the VPC, security rules similar to firewall rules may be set up by the client for incoming and outgoing traffic with respect to the VPC, and so on.

In the example scenario shown in FIG. 11, VPC 1111A and VPC 1111B have been set up within VCS 1105. The client or clients on whose behalf these VPCs are set up have requested the creation of a latency-sensitive placement group (LPG) 1181 with an associated placement policy, and subsequently requested that a set of compute instances be run within the LPG 1181. Accordingly, the CPSs of the VCS may choose virtualization hosts within a single network cell to run the compute instances. For example, CI 1160A of LPG 1181, comprising a virtual machine at which Application A business logic 1161A of a client is executed within VPC 111A may be run at VH 1150A within network cell 1104. Similarly, CI 1160B of LPG 1181, comprising a virtual machine at which Application A business logic 1161B is executed may be run at VH 1150B within network cell 1104. Within VPC 1111B, CI 1160K of the LPG 1181 may be run at VH 1150K within the same network cell 1104, and CI 1160L of the LPG 1181 may be run at VH 1150L within the same network cell 1104. CI 1160K may be used to run Application B business logic 1162A, while CI 1160L may be used to run Application B business logic 1162B. Application A and Application B may be part of a latency-sensitive application group (LSAG) for which the LPG 1181 is established. In at least some embodiments, the LPG 1181 may be established in response to a programmatic request from one VCS client associated with a particular customer account. The client may then share LPG 1181 with a second client associated with a different customer account. After the LPG 1181 and its associated placement policy are shared, either client may request that compute instances be launched or run within the LPG in accordance with the corresponding placement policy. In some embodiments, an LPG may also be referred to as a cluster placement group, and/or an associated placement policy may be referred to as a cluster placement policy.

Respective CIs within the two VPCs 1111A and 1111B may be assigned network addresses within the private address ranges of the VPCs in the depicted embodiment. To enable traffic to flow between the CIs of the two VPCs, a request to configure a scalable virtual gateway may be submitted by a VCS client via programmatic interfaces 1177 in the depicted embodiment. Either in the request to create the SVG, or via a subsequent programmatic interaction, the VCS control plane may be notified that the SVG is to be used for VPC-to-VPC traffic 1101 of the LPG 1181 in the depicted embodiment. Accordingly, the nodes of the SVG, including at least some PPNs 1191 and/or at least some RDNs 1192, may be co-located within the network cell 1104 by the CPSs. In embodiments in which the PPNs and/or the RDNs are run at respective virtual machines or compute instances, VHs of the LPG 1181 may be selected by the CPSs for the PPNs and/or RDNs. In at least some embodiments, while the LPG itself may comprise the CIs used for running the clients' applications, hosts within the same network cell that is used for those CIs may be chosen by the CPSs to run the nodes of the co-located SVG 1190. As a result of this choice, the latency for messages of VPC-to- VPC traffic 1101 may be substantially reduced, compared for example to a scenario in which the hosts for running SVG nodes are chosen at random by the CPSs. Note that at least in some embodiments, an LPG itself may simply comprise a collection of VMs running client applications, and the SVG VMs may not be considered part of the LPG; decisions regarding placement of SVG nodes may be made by the CPSs (although such decisions may be influenced by information about the LPG), and not by the clients themselves.

When a packet which originates at a CI of VPC 1111A and is directed to a CI of VPC 111B is received at a PPN 1191 of the SVG, the PPN may perform one or more packet processing tasks with respect to the packet. In some cases, the packet processing tasks may comprise replicating the received message and sending it to a destination in accordance with a replication graph created/updated by an RDN. In at least one embodiment, different sets of packet processing tasks may be performed for traffic flowing in respective directions between two sets of communicating entities. For example, in one example scenario, packets originating at resources within VPC 1111A may be replicated so that different recipients within VPC 111B obtain respective replicas at about the same time, and NAT (network address translation) may also be performed, e.g., in case sources and destinations happen to have overlapping addresses. In the opposite direction, packet replication need not be performed, while NAT may be performed and operations such as packet filtering may be performed.

Figure 12:
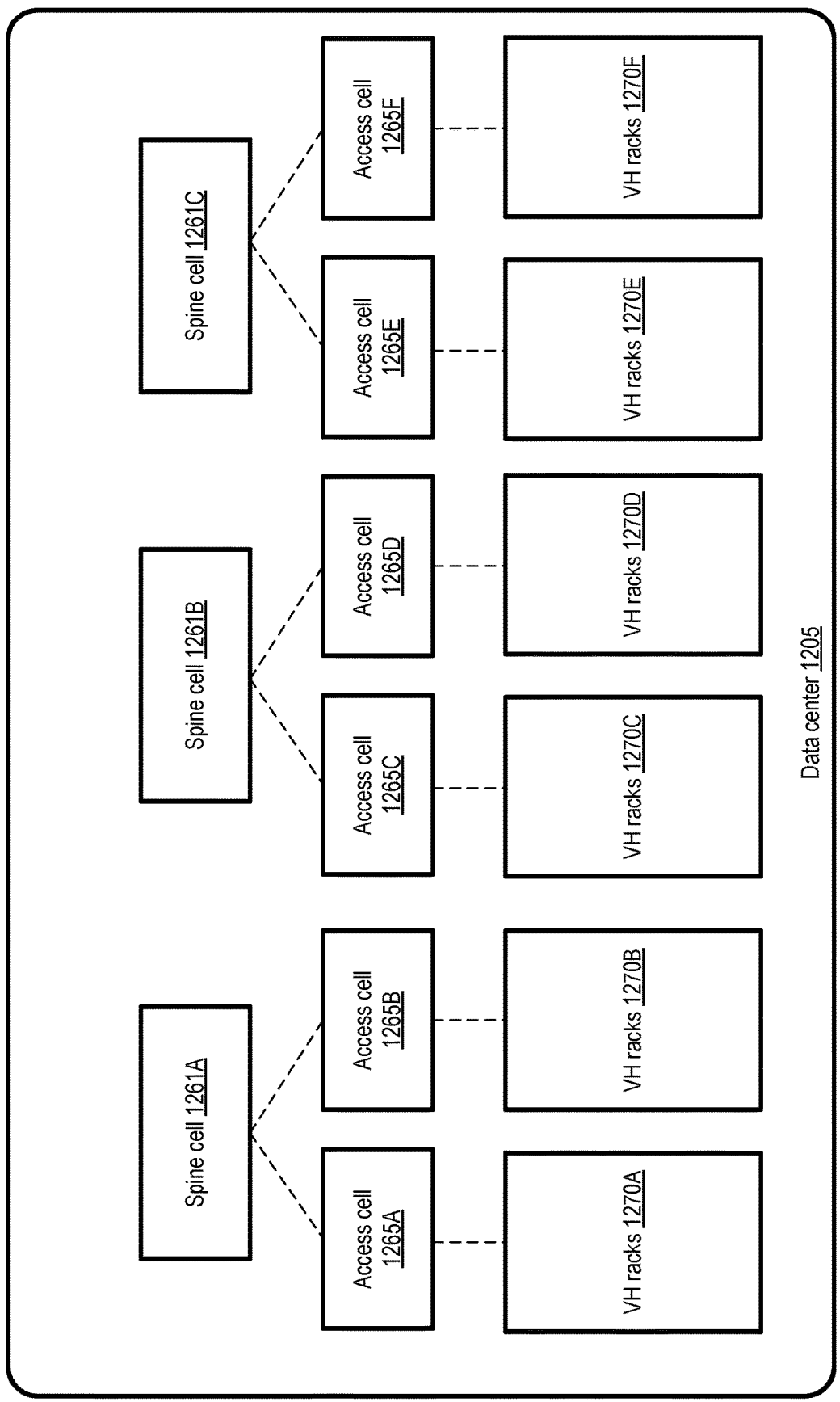
FIG. 12 illustrates an example hierarchy of network cells of a data center of a cloud provider network, according to at least some embodiments.

In some embodiments, several kinds of network cells may be configured at a cloud provider network. FIG. 12 illustrates an example hierarchy of network cells of a data center of a cloud provider network, according to at least some embodiments. A data center 1205 comprises at least two levels of a network cell hierarchy: spine cells and access cells. A given spine cell such as 1261A, 1261B or 1261C may comprise some number of lower-level access cells. Spine cell 1261A may include access cell 1265A (comprising VH racks 1270A) and access cell 1265B (comprising VH racks 1270B). Spine cell 1261B may include access cell 1265C (comprising VH racks 1270C) and access cell 1265D (comprising VH racks 1270D), while spine cell 1261C may include access cell 1265E (comprising VH racks 1270E) and access cell 1265F (comprising VH racks 1270F). Cells at each layer may comprise respective networking infrastructure components, such as cables, switches and the like in the depicted embodiment. The networking infrastructure of a higher-level cell such as a spine cell may include the networking infrastructure components of all its constituent child lower level cells such as access cells.

In general, in a multi-layer cell hierarchy, packets originating at a given VH may have to travel at least slightly longer distances, and hence typically take slightly longer times, to reach destinations that are not in the same cell at the same layer. Even longer distances may be traveled to reach another cell which is not part of the same higher level or parent cell. For example, it may take slightly longer on average for a packet to be sent from a first VH at VH racks 1270A of access cell 1265A to a second VH at VH racks 1270B of access cell 1265B, than it would take for a packet to be sent to another VH in VH racks 1270A. Similarly, it may take slightly longer for packets to be sent from VH racks 1270A to VH racks 1270C than for packets to be sent from VH racks 1270A to VH racks 1270B, and so on. For application groups that are extremely latency sensitive, even small differences in latency may be critical, so the compute instances used for such application groups may be provisioned at hosts in the same lower-level cell to the extent possible, and the differences in latency between the different layers may be taken into account when choosing the resources for SVGs as well. Note that in some embodiments, there may be more than two layers of network cells in a given data center. In other embodiments, only a single layer of network cells may be set up. Regardless of the number of layers in the hierarchy, the CPSs of a VS may take latency differences pertaining to message traffic within and across network cells into account based on client-specified policies or placement groups in various embodiments.

Figure 13:
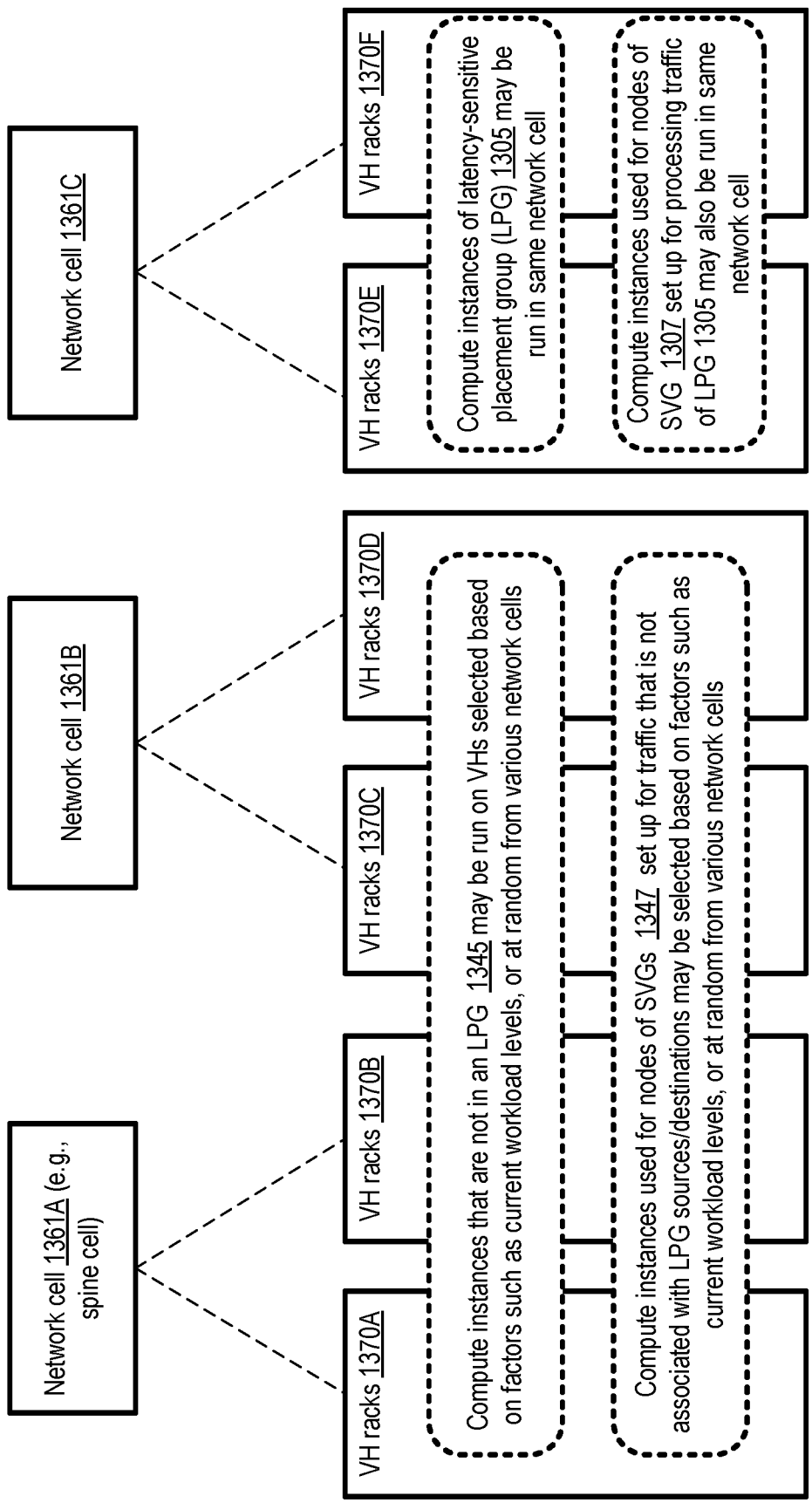
FIG. 13 illustrates an example scenario in which virtualization hosts within the same network cell may be used for compute instances of a scalable virtual gateway and a latency-sensitive placement group, according to at least some embodiments.

FIG. 13 illustrates an example scenario in which virtualization hosts within the same network cell may be used for compute instances of a scalable virtual gateway and a latency-sensitive placement group, according to at least some embodiments. In the depicted embodiment, network cell 1361 (such as a spine cell) includes VH racks 1370A and 1370B, network cell 1361B includes VH racks 1370C and 1370D, and network cell 1361C includes VH racks 1370E and 1370F.

In various embodiments, when a VCS client requests a launch of a compute instance or a set of compute instances, the VCS control plane servers may use a variety of factors to select the virtualization host(s) on which the instances will run. If a client has not specified a latency-sensitive placement policy or placement group for the instance or instances, as in the case of instances 1345, in at least some embodiments, the compute instances may be launched at virtualization hosts selected based on factors such as current workload levels of the hosts, or at random. Even in cases in which hosts are selected based on workload levels, the network cells from which those hosts are selected may in effect be randomly chosen, since workload levels may not necessarily be correlated with network cells. Similarly, hosts for compute instances running nodes of SVGs 1347, in cases in which the SVGs are not set up for traffic associated with LPG sources/destinations, may also be chosen based on workload levels or effectively at random with respect to networking cell membership of the hosts.

In contrast, in the depicted embodiment, compute instances of an LPG 1305 may all be placed on hosts that are part of the same network cell (such as cell 1361C). Similarly, compute instances that are to run nodes of an SVG 1307 which is to process traffic of an LPG's compute instances may also be run in the same network cell in at least some embodiments. Note that in some embodiments, while the VCS CPSs may make a best effort to provision the compute instances of LPGs and their SVGs within single network cells, it may nevertheless be the case that sometimes there may not be sufficient capacity available in the target network cells, especially if new nodes or compute instances are added as the workload increases. In such cases, the CPSs may attempt to place the surplus compute instances (i.e., the compute instances that cannot be accommodated in the network cell in which most of the other compute instances of the LPG and/or SVG are already placed) in nearby network cells.

Figure 14:
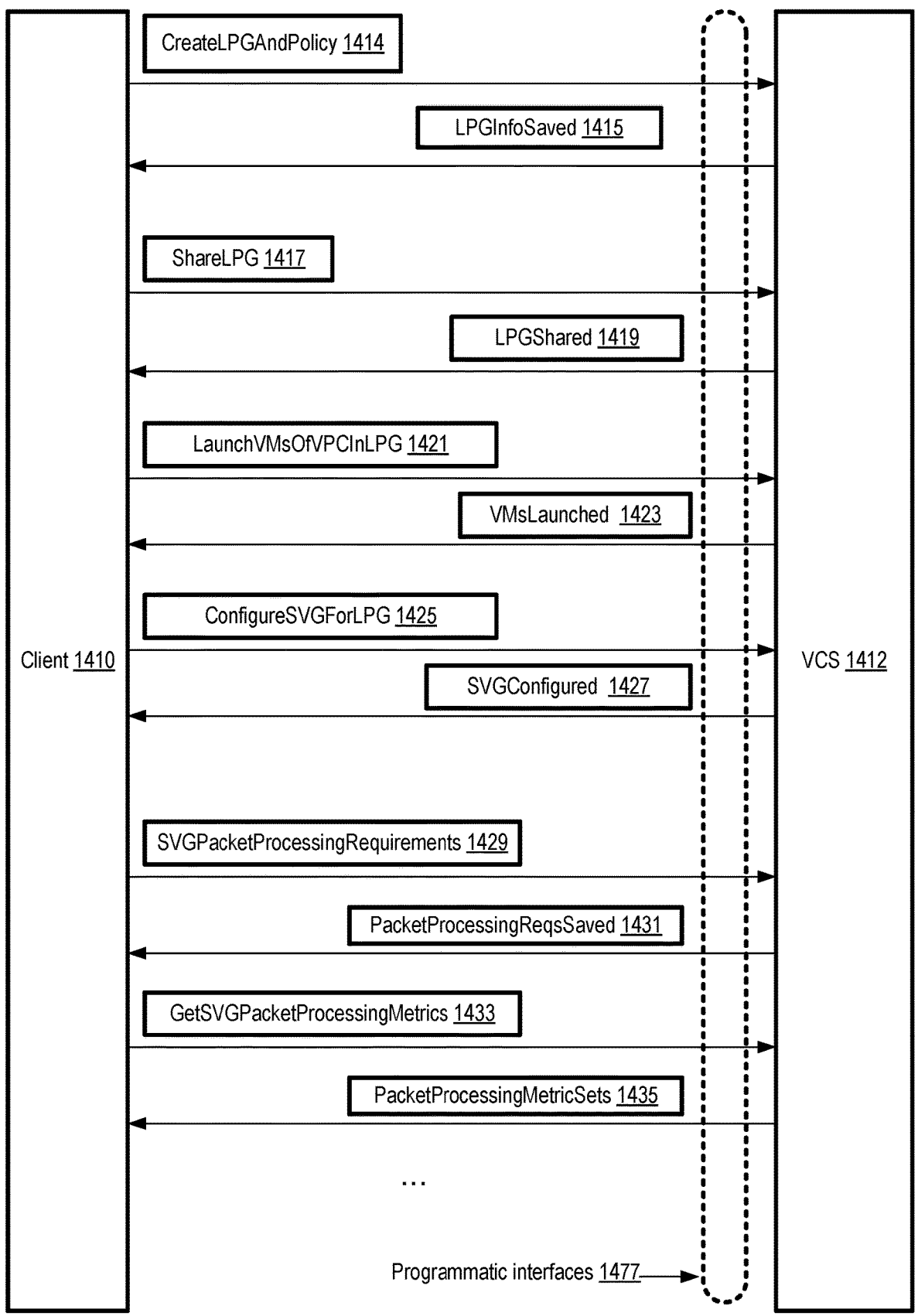
FIG. 14 illustrates example programmatic interactions, pertaining to the selection of resources used for scalable virtual gateways based on client-specified placement policies for traffic sources and destinations, according to at least some embodiments.

FIG. 14 illustrates example programmatic interactions, pertaining to the selection of resources used for scalable virtual gateways based on client-specified placement policies for traffic sources and destinations, according to at least some embodiments. A VCS 1412, similar in features and functionality to VCS 1105 of FIG. 11, may implement a set of programmatic interfaces 1477 in the depicted embodiment, such as one or more web-based consoles, command-line tools, graphical user interfaces and/or APIs. Clients 1410 (e.g., owners/operators of various latency-sensitive applications or application groups that are run using resources of the VCS) may utilize the programmatic interfaces to submit requests and information pertaining to their applications, and receive corresponding responses.

A client 1410 may submit a CreateLPGAndPolicy request 1414, requesting the creation of a latency-sensitive placement group with an associated placement policy for some set of virtual machines or compute instances. Note that in some embodiments, different placement policies may be specified for respective LPGs. A client may, for example, indicate that according to a first policy PlacementPolicy-A, VMs within a specified LPG should preferably be placed on hosts chosen such that the latency for messages between any two of the VMs is to be no more than T1 milliseconds. That client or another client may also indicate that according to a second policy PlacementPolicy-B, VMs within another LPG should preferably be placed on hosts chosen such that the latency for messages between any two of VMs is to be no more than T2 milliseconds, with a maximum variation in latency to be no more than T3 milliseconds. The requested placement group and policy may be stored at a metadata repository of the VCS, and an LPGInfoSaved message 1415 may be sent to the client.

In some cases, different applications of a latency-sensitive application group may be run at VMs acquired on behalf of distinct customer accounts of the cloud provider network. For example, one application App1 may be run using VMs set up on behalf of a client C1 with a customer account Acct1, and another application may be run using VMs set up on behalf of a second client C2 with a customer account Acct2. In order to ensure that both such applications can be run using resources within the same network cell or the same portion of a data center, one of the clients may first request the creation of an LPG with an associated placement policy, and then share the LPG with the customer account of the second client. A ShareLPG request 1417 may be sent by the client on whose behalf the LPG was created, with the request 1417 indicating the other customer account with which the LPG is to be shared. Metadata indicating that the LPG and its associated placement policy should be shared with the other account may be stored by the VCS, and an LPGShared message 1419 may be sent to the client who submitted the ShareLPG request in some embodiments.

A LaunchVMsOfVPCInLPG request 1421 may be submitted in some embodiments by a client to request that one or more VMs of a particular VPC be launched within a specified LPG. Accordingly, hosts within a network cell chosen for the LPG may be selected for launching the VMs by the VCS control plane, and the instances may then be launched. A VMsLaunched message 1423 may be sent to the client. In scenarios in which an LPG is shared among clients associated with different customer accounts, each of the clients may submit a respective LaunchVMsOfVPCinLPG request for their sets of VMs, all of which may be launched within a single network cell, assuming sufficient capacity is available in the cell.

A client may submit a ConfigureSVGForLPG request 1425 in various embodiments, indicating that an SVG is to be established or re-configured for traffic flowing between VMs of an LPG. In some cases, a parameter of the ConfigureSVGForLPG request may indicate that a new SVG is to be created, while in other cases, an identifier of a pre-created SVG which is to be re-configured for the traffic of the LPG may be provided as a parameter. In the case where a new SVG is to be established, at least some nodes (e.g., PPNs and/or RDNs) of the new SVG may be run on hosts that are part of the same network cell as the VMs of the clients for whom the SVG was created. In the case where an existing SVG is to be re-configured, and the nodes of the SVG currently are not in the same network cell as the traffic sources/destinations, at least some nodes of the SVG may be migrated to hosts within the network cell. An SVGConfigured message 1427 may be sent to the client in some embodiments.

In at least some embodiments, a given SVG which is configured for processing traffic of VMs running within an LPG may also be used concurrently for processing traffic of other VMs which are not part of the LPG. For example, consider a scenario in which VPCs VPC-A and VPC-B both comprise VMs that are launched within a particular LPG, while VPC-C and VPC-D comprise VMs that are not in the LPG (and hence may have been launched on hosts that are in a different network cell than the VMs of VPC-A and VPC-B). If a client requests that an SVG be configured for the traffic flowing between VPC-A and VPC-B, the VCS control plane may run nodes of the SVG at hosts in the same network cell as the VMs of those VPCs. However, that SVG may also be used for traffic flowing between VPC-A and VPC-C, VPC-B and VPC-C, or VPC-C and VPC-D, and thus may not be restricted to processing the traffic of the LPG alone. In one embodiment, a client may request that an SVG be used exclusively for the traffic of a specified LPG, in which case (in the above example) traffic of VPC-C or VPC-D may not be processed at that SVG.

In various embodiments a VCS client may submit an SVGPacketProcessingRequirements message 1429 to indicate the kinds of packet processing tasks that are to be performed at an SVG's nodes. A variety of tasks may be indicated, such as packet replication (which may be accomplished using replication graphs of the kind discussed earlier), network address translation, packet inspection or filtering, security rule enforcement, and the like. In some cases, different types of packet processing tasks may be performed for packets transferred from one VPC VPC-A to another VPC VPC-B, than are performed for packets transferred in the reverse direction (from VPC-B to VPC-A). The requirements may be saved and propagated to SVG RDNs in some embodiments. A PacketProcessingReqsSaved message 1431 may be sent to the client in the depicted embodiment. RDNs may generate packet processing directives (e.g., executable programs implementing the packet processing tasks) from the requirements and transmit the directives to the PPNs of the SVG for implementation. At the PPNs, in some embodiments the directives may be cached and re-used for other packets of the same packet flow.

Clients 1410 may request various kinds of metrics pertaining to SVGs in different embodiments, e.g., via one or more GetSVGPacketProcessingMetrics requests 1433. The metrics may include, for example, the measured latencies for packet processing and delivery, the total amount of data that was transmitted using a specified SVG, counts of packet drops, statistics such as variance or standard deviations of the latency, the fraction of times that packet processing tasks were performed in the same network cell as the sources and destinations of the packets, and so on. The requested metrics may be provided to the client via one or more PacketProcessingMetricSets messages 1435 in the depicted embodiment. In at least some embodiments, programmatic interactions pertaining to placement groups, policies, and SVGs used for latency-sensitive applications, other than those shown in FIG. 14, may be supported by a VCS.

Figure 15:
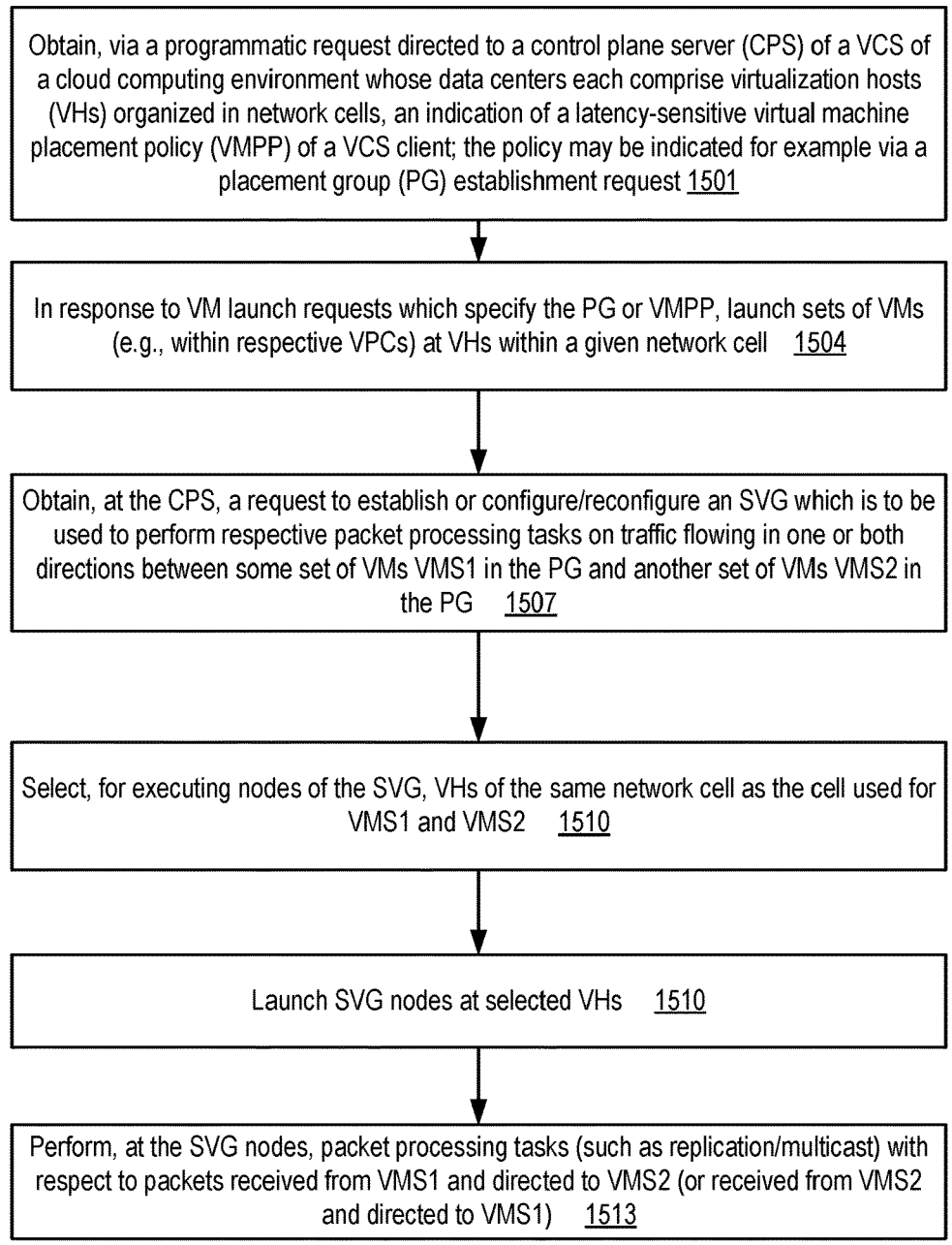
FIG. 15 is a flow diagram illustrating aspects of operations pertaining to the selection of resources used for scalable virtual gateways based on client-specified placement policies for traffic sources and destinations, according to at least some embodiments.

FIG. 15 is a flow diagram illustrating aspects of operations pertaining to the selection of resources used for scalable virtual gateways based on client-specified placement policies for traffic sources and destinations, according to at least some embodiments. As shown in element 1501, an indication of a virtual machine placement policy (VMPP) of a VCS client may be obtained via programmatic interfaces at a CPS of a VCS of a cloud computing environment. The cloud computing environment's data centers may be organized as a collection of network cells, with each network cell comprising a set of networking infrastructure equipment and virtualization hosts positioned relatively close together in a particular portion of the data center. The VMPP may, for example, be indicated as a parameter of a request to establish a placement group (PG).

In response to programmatic requests to launch VMs, with parameters of the launch requests indicating the VMPP or the PG, various sets of VMs may be launched at VHs within a given network cell in the depicted embodiment (element 1504). One set of VMs may be launched as part of one VPC, and assigned network addresses from a private address range of that VPC, while another set of VMs may be launched as part of a different VPC, and assigned network addresses from the second VPC's private address range.

A request to establish or configure/reconfigure an SVG which is to be used to perform respective packet processing tasks on traffic flowing in one or both directions between respective sets of VMs VMS1 and VMS2 in the PG may be received at a CPS (element 1507) in various embodiments. In response to the request pertaining to the SVG, VHs within the same network cell as the cell used for VMS1 and VMS2 may be chosen (element 1510) by the CPS for running at least some nodes of the SVG. One or more SVG nodes (such as PPNs and/or RDNs) may then be launched at the selected VHs, or migrated to the selected VHs if the SVG was already created. At the SVG nodes, one or more kinds of packet processing tasks may be performed on packets which originate at VMs of VMS1 and are directed to VMs of VMS2 (and/or on packets which originate at VMs of VMS2 and are directed to VMs of VMS1) (element 1513).

Figure 16:
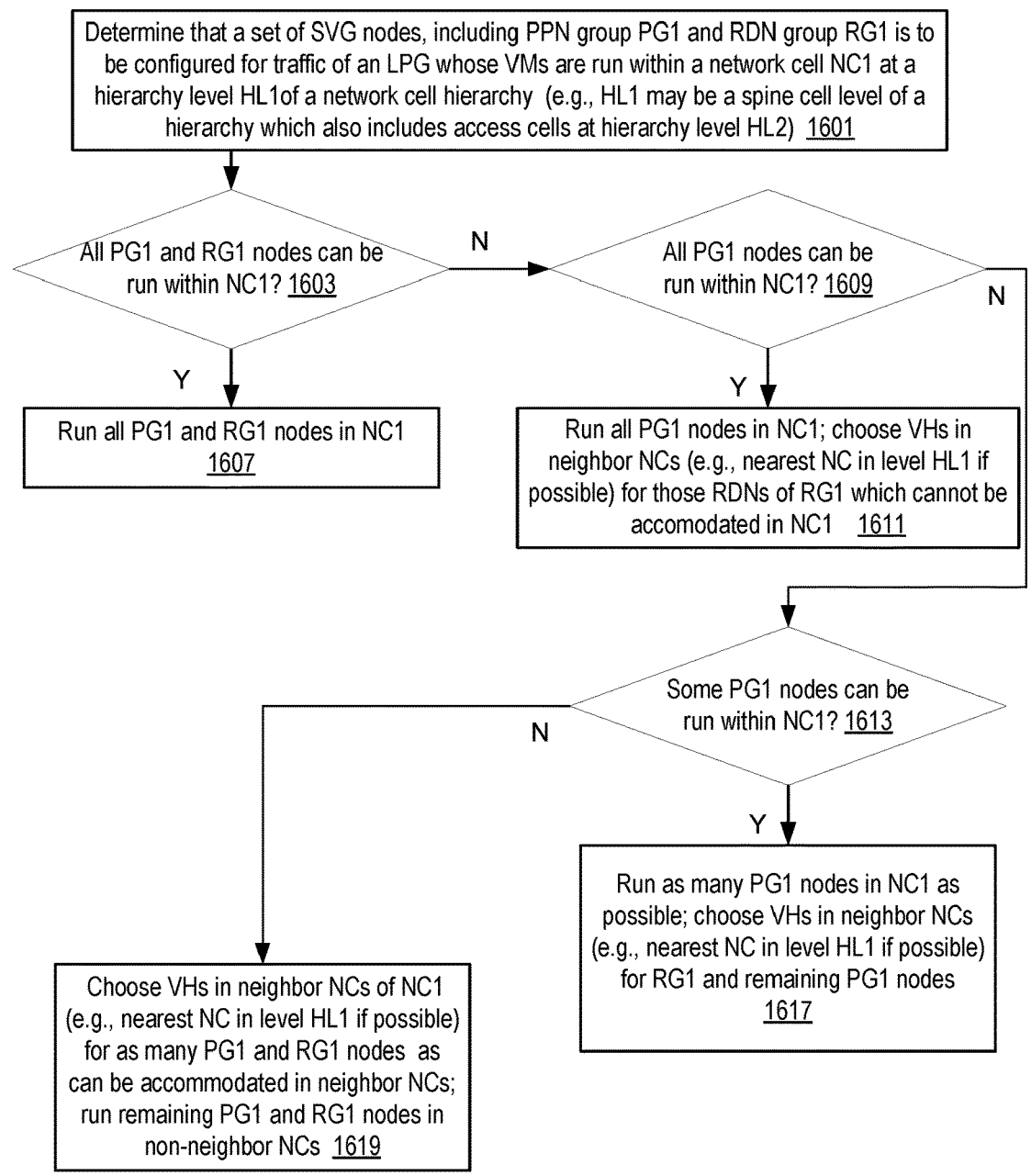
FIG. 16 is a flow diagram illustrating aspects of operations pertaining to the selection of virtualization hosts for different categories of nodes of scalable virtual gateways, according to at least some embodiments.

FIG. 16 is a flow diagram illustrating aspects of operations pertaining to the selection of virtualization hosts for different categories of nodes of scalable virtual gateways, according to at least some embodiments. As shown in element 1601, a determination may be made that a set of SVG nodes, including a PPN group PG1 and an RDN group RG1 is to be configured for traffic of an LPG whose VMs are run within a network cell NC1 at a hierarchy level HL1 of a network cell hierarchy. For example, HL1 may be a spine cell layer of a multi-layer hierarchy of network cells which also includes an access cell layer at a lower level of the hierarchy HL2. Each network cell may comprise a number of host racks, with individual hosts having a particular computing capacity for hosting up to some number of virtual machines belonging to one or more compute instance families of the VCS. At a given point in time, depending for example on the number and type of VMs that are launched for the client applications at a network cell such as NC1, the remaining available capacity at the cell may vary. As a result, it may not always be the case that all the PPNs of PG1 and all the RDNs of RG1 can be accommodated within that cell. The CPSs of the VCS may be able to determine how much remaining capacity there is within NC1, and how that capacity compares to the capacity needed for PG1 and RG1.

If the CPSs determine that NC1 has sufficient capacity such that all PG1 and RG1 nodes can be run within NC1, as determined in operations corresponding to element 1603, all the nodes of both PG1 and RG1 may be run at virtualization hosts selected from NC1 (element 1607). If there is insufficient available capacity at NC1 for running both PG1 and RG1 nodes in their entirety, i.e., if available NC1 capacity is below the threshold for accommodating all RG1 nodes, the CPSs may then determine whether all PG1 nodes can be accommodated (element 1609).

If all PG1 nodes can be run within NC1, but at least some RG1 nodes cannot, the CPSs may execute all the PG1 nodes in NC1 (element 1611). For the remaining nodes of RG1 (or all the RG1 nodes if none can be accommodated within NC1), VHs in neighboring NCs (e.g., the physically nearest NCs in level HL1 if possible) may be chosen to run such remaining nodes.

If the operations corresponding to element 1609 indicate that not all PG1 nodes can be run using the available capacity of NC1, but that some subset of PG1 nodes can be run in NC1 (element 1613), the CPSs may run as many PG1 nodes in NC1 as is feasible (element 1617), and run the remaining PG1 nodes and RG1 nodes in neighbor NCs. If there is no available capacity to run any nodes of PG1 or RG1 within NC1, in the depicted embodiment the CPSs may choose neighbor NCs of NC1 for as many PG1 and RC1 nodes as can be accommodated in the neighbor cells (element 1619). The remaining PG1 and RG1 nodes, if any, may be run at non-neighbor NCs in such a situation. As such, in the depicted embodiment, the CPSs may try to locate as many SVG nodes in the same NC as the traffic sources/destinations, with preference given to PPNs over RDNs when it comes to co-location with the sources/destinations, and use nearby NCs as much as possible if some SVG nodes cannot be run at that NC. In one embodiment, if all the PG1 and RG1 nodes cannot be run in NC1, the client may be notified that the SVG cannot be configured as desired.

It is noted that in various embodiments, some of the operations shown in the flow diagrams of FIG. 9, FIG. 15 and FIG. 16 may be implemented in a different order than that shown in the corresponding figure, or may be performed in parallel rather than sequentially. Additionally, some of the operations shown in these flow diagrams may not be required in one or more implementations.

Figure 17:
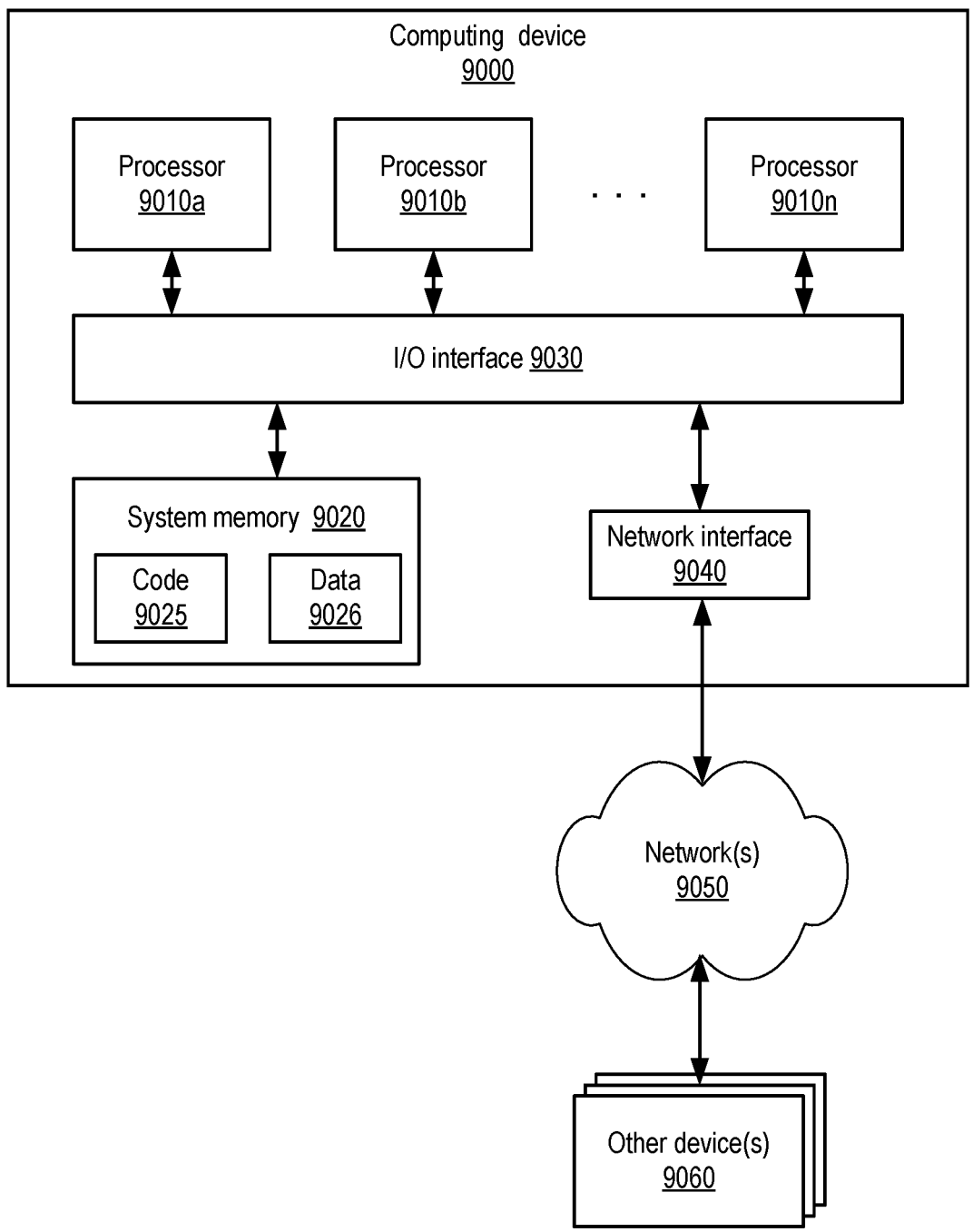
FIG. 17 is a block diagram illustrating an example computing device that may be used in at least some embodiments.

In at least some embodiments, a server that implements the types of techniques described herein (e.g., including the described functionality of VCS virtualization hosts, control plane servers, RDNs, PPNs and the like), may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a cloud computing environment; and
a set of virtualization hosts of the cloud computing environment;
wherein the control plane server is configured to:
receive message replication performance requirements of a latency-sensitive application group, wherein the latency-sensitive application group includes a message producer whose application data messages are to be replicated to a set of message consumers, wherein the message producer runs on a first virtualization host of the set of virtualization hosts, wherein individual ones of message consumers run on other virtualization hosts of the set of virtualization hosts, and wherein the message replication performance requirements include a target latency variation metric for replication of application data messages from the message producer to individual ones of the message consumers;

establish, based at least in part on the message replication performance requirements, a virtual gateway to receive application data messages from the message producer and transmit replicas of the application data messages to the set of message consumers, wherein the virtual gateway comprises a plurality of nodes including (a) a routing decisions node and (b) a collection of packet processing nodes, wherein individual ones of the plurality of nodes run on respective virtualization hosts of the set of virtualization hosts; and transmit the message replication performance requirements to the routing decisions node;

wherein the routing decisions node is configured to iteratively:

analyze a set of latency metrics for packets transmitted between at least some pairs of packet processing nodes of the collection;

generate a replication graph based at least in part on the message replication performance requirements and the set of latency metrics, wherein the replication graph represents paths for replicating messages from the message producer to the set of message consumers such that end-to-end latencies satisfy the target latency variation metric; and transmit, to individual ones of the packet processing nodes of the collection, respective replication directives, wherein an individual replication directive includes at least a portion of the replication graph; and wherein a particular packet processing node of the collection is configured to:

transmit a first replica of an application data message received at the particular packet processing node to a first destination indicated in a particular replication directive which was received from the routing decisions node.

2. The system of claim 1, wherein the routing decisions node is further configured to:

obtain an estimate of an expected elapsed time for operations performed at the particular packet processing node to generate and transmit a replica of an application data message; and indicate, in the particular replication directive, an order in which the particular packet processing node is to transmit respective replicas to a plurality of destinations, wherein the order is determined by the routing decisions node based at least in part on the estimate of the expected elapsed time; and wherein the particular packet processing node is further configured to:

transmit, in accordance with the order indicated in the particular replication directive, the first replica of the application data message to the first destination prior to transmitting a second replica of the application data message to a second destination.

3. The system of claim 1, wherein the particular replication directive indicates a buffering duration, and wherein the particular packet processing node is further configured to:

buffer, for the buffering duration, the first replica before transmitting the first replica to the first destination.

4. The system of claim 1, wherein the control plane server is further configured to:

add one or more packet processing nodes to the collection of packet processing nodes in response to a determination that a number of message consumers of the latency-sensitive application group is to be increased.

5. The system of claim 1, wherein the control plane server is further configured to:

select, for running packet processing nodes of the virtual gateway, a set of virtualization hosts whose local clocks satisfy a clock synchronization criterion.

6. A computer-implemented method, comprising:

establishing, at a cloud computing environment, a virtual gateway for transmitting traffic of an application group, wherein the virtual gateway comprises a routing decisions node and a collection of packet processing nodes;

performing, by the routing decisions node, a plurality of routing adjustment iterations, and wherein during an individual routing adjustment iteration, the routing decisions node is configured to:

analyze a set of latency metrics, including latency metrics for packets transmitted between at least some pairs of packet processing nodes of the collection;

generate a replication graph, based at least in part on a message replication performance requirement of the application group, and based at least in part on the set of latency metrics, wherein the replication graph represents paths for replicating messages from a message producer of the application group to a set of message consumers of the application group such that end-to-end latencies satisfy the message replication performance requirement of the application group; and transmit, to individual ones of the packet processing nodes of the collection, respective replication directives, wherein an individual replication directive includes at least a portion of the replication graph; and transmitting, by a particular packet processing node of the collection, a first replica of an application data message received at the particular packet processing node to a first destination indicated in a particular replication directive, wherein the particular replication directive was generated at the routing decisions node in a particular routing adjustment iteration.

7. The computer-implemented method of claim 6, further comprising:

obtaining, by the routing decisions node, an estimate of an expected elapsed time for operations performed at the particular packet processing node to generate and transmit a replica of an application data message;

indicating, by the routing decisions node in the particular replication directive, an order in which the particular packet processing node is to transmit respective replicas to a plurality of destinations, wherein the order is determined by the routing decisions node based at least in part on the estimate of the expected elapsed time; and transmitting, by the particular packet processing node, in accordance with the order indicated in the particular replication directive, the first replica of the application data message to the first destination prior to transmitting a second replica of the application data message to a second destination.

8. The computer-implemented method of claim 6, wherein the particular replication directive indicates a buffering duration, the computer-implemented method further comprising:
buffering, by the particular packet processing node for the buffering duration, the first replica before transmitting the first replica to the first destination.

9. The computer-implemented method of claim 6, further comprising:
selecting, for running packet processing nodes of the virtual gateway, a set of hosts whose respective local clocks satisfy a clock synchronization criterion, wherein the latency metrics for packets transmitted between at least some pairs of packet processing nodes are obtained using timestamps generated using the respective local clocks.

10. The computer-implemented method of claim 9, wherein a local clock of a particular host of the set of hosts is implemented at a virtualization management offloading card of the particular host.

11. The computer-implemented method of claim 6, wherein the message producer is part of a first application of the application group, wherein the first destination comprises a first message consumer of the set of message consumers, wherein the first message consumer is part of a second application of the application group, and wherein the application data message received at the particular packet processing node indicates a completion of a first transaction at the first application, the computer-implemented method further comprising:
transmitting, to the first application from the first message consumer, a request for a second transaction, wherein the request for the second transaction is generated based on a time-sensitive analysis of the first replica of the application data message.

12. The computer-implemented method of claim 6, wherein the application group comprises at least one of: (a) a financial transaction processing application, (b) a distributed game-playing application or (c) a digital advertising application.

13. The computer-implemented method of claim 6, wherein the message replication performance requirement indicates a limit on a difference between end-to-end latencies for propagating replicas of a message from the message producer to individual message consumers of the set of message consumers.

14. The computer-implemented method of claim 6, further comprising:
initiating, by the routing decisions node, a particular routing adjustment iteration based at least on part on one or more of: (a) a time which has elapsed since a previous routing adjustment iteration was initiated or (b) a change in a number of message consumers included in the collection of message consumers.

15. The computer-implemented method of claim 6, further comprising:
selecting, for running at least some packet processing nodes of the virtual gateway, a set of hosts of the cloud computing environment, based at least in part on respective physical locations of individual hosts of the set of hosts.

16. A non-transitory computer-accessible storage medium storing program instructions that when executed on a processor:
generate a replication graph by a routing decisions node of a virtual gateway established for transmitting traffic of an application group, based at least in part on performance requirements of the application group, and based at least in part on a set of latency metrics obtained from a collection of packet processing nodes of the virtual gateway, wherein the replication graph represents paths for replicating messages from a message producer of the application group to a set of message consumers of the application group such that end-to-end latencies to individual ones of the message consumers satisfy a performance requirement of the application group;
transmit, from the routing decisions node, to individual ones of the packet processing nodes of the collection, respective replication directives, wherein an individual replication directive includes at least a portion of the replication graph; and
transmit, by a particular packet processing node of the collection, a first replica of an application data message received at the particular packet processing node to a first destination indicated in a particular replication directive, wherein the particular replication directive was generated at the routing decisions node.

17. The non-transitory computer-accessible storage medium of claim 16, storing further program instructions that when executed on the processor:
obtain, by the routing decisions node, an estimate of an expected elapsed time for operations performed at the particular packet processing node to generate and transmit a replica of an application data message;
indicate, by the routing decisions node in the particular replication directive, an order in which the particular packet processing node is to transmit respective replicas to a plurality of destinations, wherein the order is determined by the routing decisions node based at least in part on the estimate of the expected elapsed time; and
transmit, by the particular packet processing node, in accordance with the order indicated in the particular replication directive, the first replica of the application data message to the first destination prior to transmitting a second replica of the application data message to a second destination.

18. The non-transitory computer-accessible storage medium of claim 16, wherein the particular replication directive indicates a buffering duration, the non-transitory computer-accessible storage medium storing further program instructions that when executed on the processor:
buffer, by the packet processing node for the buffering duration, the first replica before transmitting the first replica to the first destination.

19. The non-transitory computer-accessible storage medium of claim 16, storing further program instructions that when executed on the processor:
update, by the routing decisions node, the replication graph based at least in part on obtaining an updated set of latency metrics of the collection of packet processing nodes; and
transmit at least a portion of the updated replication graph to the particular packet processing node.

20. The non-transitory computer-accessible storage medium of claim 16, wherein the particular packet processing node runs on a virtual machine of a cloud computing environment.

* * * * *